United States Patent

Enari et al.

[11] Patent Number: 5,838,826
[45] Date of Patent: Nov. 17, 1998

[54] IMAGE PROCESSING APPARATUS AND METHOD USING PLURAL AMOUNTS CORRESPONDING TO ENCODED DATA TO CONTROL ENCODING

[75] Inventors: Masahiko Enari; Nobuhiro Hoshi; Hiroshi Takizawa, all of Yokohama, Japan

[73] Assignee: Canon Kabushiki Kaisha, Tokyo, Japan

[21] Appl. No.: 312,942

[22] Filed: Sep. 30, 1994

Related U.S. Application Data

[63] Continuation of Ser. No. 813,832, Dec. 27, 1991, abandoned.

[30] Foreign Application Priority Data

| Dec. 28, 1990 | [JP] | Japan | 2-408947 |
| Apr. 15, 1991 | [JP] | Japan | 3-082401 |
| Apr. 15, 1991 | [JP] | Japan | 3-082402 |
| Apr. 17, 1991 | [JP] | Japan | 3-085386 |

[51] Int. Cl.[6] .............. G06K 9/036; G06K 9/46
[52] U.S. Cl. ............. 382/234; 348/405; 382/251
[58] Field of Search ............... 382/232, 234, 382/236, 246, 250, 251; 348/405; 358/500

[56] References Cited

U.S. PATENT DOCUMENTS

| 4,746,978 | 5/1988 | Shimura | 348/405 |
| 4,831,636 | 5/1989 | Taniguchi et al. | 358/133 |
| 4,922,273 | 5/1990 | Yonekawa et al. | 358/429 |
| 4,953,019 | 8/1990 | Skikakura et al. | 348/405 |
| 4,982,282 | 1/1991 | Saito et al. | 358/133 |
| 4,984,076 | 1/1991 | Watanabe et al. | 358/133 |
| 5,073,820 | 12/1991 | Nakagawa et al. | 348/405 |
| 5,073,821 | 12/1991 | Juri | 358/135 |
| 5,144,423 | 9/1992 | Knauer et al. | 348/405 |
| 5,146,324 | 9/1992 | Miller et al. | 358/133 |
| 5,432,556 | 7/1995 | Hatano et al. | 382/251 |

FOREIGN PATENT DOCUMENTS

| 0267579 | 5/1988 | European Pat. Off. | H04N 7/133 |
| 267579 | 5/1988 | European Pat. Off. | |
| 0380081 | 8/1990 | European Pat. Off. | H03M 7/30 |
| 0401854 | 12/1990 | European Pat. Off. | H04N 7/133 |
| 02174482 | 7/1990 | Japan | H04N 7/13 |
| 02248180 | 10/1990 | Japan | H04N 7/13 |

Primary Examiner—Joseph Mancuso
Assistant Examiner—Jayanti K. Patel
Attorney, Agent, or Firm—Fitzpatrick, Cella, Harper & Scinto

[57] ABSTRACT

An image processing apparatus including: an input device for inputting image data; a first encoding device for encoding the image data with first parameter; a second encoding device for encoding the image data with second parameter; a first counting device for counting the first amount of encoded image data encoded by the first encoding device; a second counting device for counting second amount of encoded image data encoded by the second encoding device; and a calculating device for calculating third parameter, with which the image data is encoded to a predetermined amount of encoded data, in accordance with both of the first and the second amounts of encoded image data.

28 Claims, 17 Drawing Sheets

IMAGE PROCESSING APPARATUS AND METHOD USING PLURAL AMOUNTS CORRESPONDING TO ENCODED DATA TO CONTROL ENCODING

This application is a continuation of application Ser. No. 07/813,832, filed Dec. 27, 1991, now abandoned.

BACKGROUND OF THE INVENTION

1. Field of the Invention

The present invention relates to an image processing apparatus, and, more particularly, to an image processing apparatus for compressing a digital image and transmitting compressed data to a transmission medium or a storage medium or the like.

2. Related Background Art

FIG. 7 illustrates a conventional image encoding apparatus in which image data received at a terminal 101 is analog-to-digital (hereinafter abbreviated to "A/D") converted in an A/D converter 102 before it is formed into a variable-length compressed code in an encoding unit 103. Then, data about the variable-length compressed code is temporarily stored in a transmission buffer memory 104 before it is transmitted to a transmission path 106. At this time, a control coefficient for use to control the quantity of data about the variable-length compressed code generated in the encoding unit 103 is generated depending upon the degree of the data occupancy of a buffer memory 107 and the transmission rate of the transmission path 106 so as to be fed back to the encoding unit 103 via a filter 105. As a result, compressed data about an image can, in an averaged manner, be transmitted at a rate of the transmission path 106. Data received via the transmission path 106 is temporarily stored in a receiving buffer memory 107 so as to, together with the supplied control coefficient, be transmitted to a decoding unit 108. As a result, variable-length compressed encoded data is extended and decoded before it is digital-to-analog converted in a D/A converter 109 so that an image is transmitted through a terminal 110.

A variety of systems for compressing the color image to be performed in the encoding unit 103 shown in FIG. 7 have been disclosed. Among others a so-called ADCT system has been suggested as a preferable color imaging encoding system.

FIG. 8 is a schematic structural view which illustrates an image encoding apparatus structured to act according to the above-described ADCT system. The above-described apparatus is arranged to receive an image constituted by 8 bits, that is, data converted into 256 gradations/color by the A/D converter 102 shown in FIG. 7, the input image being composed of three or four colors, that is, RGB, YUV, YPbPr, L*a*b* or YMCK or the like. The input image is, by a DCT unit 201, immediately subjected to a two-dimensional discrete cosine transformation (hereinafter abbreviated to a "DCT") in units of sub-blocks each of which is composed of 8×8 pixels. Then, its conversion coefficient is linearly quantized in a linear quantizing unit 202. Each conversion coefficient has a different quantizing step size which is made to be a value obtained by, by K, multiplying an 8×8 quantization matrix element the 8×8 quantization matrix being employed while taking into consideration the difference in each conversion coefficient of the visual sensitivity for sensing the quantization noise, where K is called a "control coefficient". The value of K is used to control the image quality and the quantity of compressed and generated data. Table 1 shows an example of a quantization matrix element stored in a quantization matrix storage unit 203. That is, since the quantization step is reduced when K is enlarged, the image quality deteriorates and the data quantity decreases.

TABLE 1

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

After the quantization has been completed, a DC conversion component (hereinafter called a "DC component") is, in a one-dimensional prediction unit 204, subjected to a one-dimensional forecasting between adjacent sub-blocks. As a result, the forecasted error is huffman-encoded in a huffman encoding unit 205.

Then, the quantization output denoting the forecasted error is divided into groups so that the identification number of a group which includes the forecasted error is huffman-encoded before the value of the quantization output in the group is expressed by an isotonic code.

An AC conversion component (hereinafter called an "AC component") except for the DC component is encoded in a zigzag scanning unit 206 in such a manner that the above-described quantization output is zigzag scanned in a direction from the low frequency component to the high frequency component as shown in FIG. 9. That is, conversion coefficients (hereinafter called a "significant coefficient"), the quantization output of each of which is not zero, are classified into groups depending upon their values. Then, the identification number of the group and the number of the conversion coefficients (hereinafter called an "invalid coefficient"), the quantization output of which is zero and which are held between significant coefficients positioned in front of it, are caused to form a pair so as to be huffman encoded in the huffman encoding unit 207. Then, the value of the quantization output in the group is expressed by an isotonic code.

However, in the thus-arranged image encoding apparatus, the quantity of information received to be compressed and generated is different for each image. Therefore, it is very difficult to estimate the buffer memory quantity shown in FIG. 7. If the same is too small, a portion of some types of images is destroyed. If the same is too large, the required capacity of hardware becomes too large, causing a problem to arise in that the system cannot be stably designed. In this case, the cost is raised excessively. Furthermore, since control coefficient K is arranged to be fed back, the same image is controlled with a different control coefficient depending upon the previous image. Therefore, the image quality is undesirably changed with time, causing a problem to arise in that an image, the quality of which is unsatisfactory level, will be formed. Furthermore, since the terminative end of an image and the control region of recorded data do not coincide with each other, the joint recording, searching, editing functions and the like cannot easily be realized in view of the fact that the transmission path comprises the recording medium such as a magnetic tape or an optical disk.

In addition, in a case where the above-described technology is applied to a still image system which has no buffer memory, the control coefficient is made to be a predetermined coefficient and no feedback is performed. Therefore, a problem arises in that the time required to complete transmission of one image cannot be specified. Another problem arises in that it is impossible to estimate the capacity required to record one image.

On the other hand, a variety of code length control technologies have been disclosed in U.S. patent application Ser. No. 669,655, U.S. patent application Ser. No. 738,562 and new U.S. Patent Application based on Japanese Patent Application Nos. 2-204793, 2-204798, 2-201104, 2-204797 and 2-281955.

SUMMARY OF THE INVENTION

An object of the present invention is to overcome the problems experienced with the above-described conventional technology. That is, an object of the present invention is to, at high speed, control the quantity of data compression at the time of compressing data.

In order to achieve the above-described objects, according to one aspect of the present invention, there is provided an image processing apparatus comprising: input means for inputting image data; first encoding means for encoding the image data with a first parameter; second encoding means for encoding the image data with a second parameter; first counting means for counting the first amount of encoded image data encoded by the first encoding means; second counting means for counting second amount of encoded image data encoded by the second encoding means; and calculating means for calculating a third parameter, with which the image data is encoded to a predetermined amount of encoded data, in accordance with both of the first and the second amounts of encoded image data.

Another object of the present invention is to improve the algorithm for controlling the quantity of data to be compressed at the time of compressing data.

Another object of the present invention is to provide a reliable data compressing algorithm.

In order to achieve the above-described object, according to another aspect of the present invention, there is provided an image processing method comprising steps of: input step of inputting image data; first encoding step of encoding the image data with a first parameter; second encoding step of encoding the image data with a second parameter; first counting step of counting the first amount of encoded image data encoded in the first encoding step; second counting step of counting second amount of encoded image data encoded in the second encoding step; and calculating a step of calculating third parameter, with the image data is encoded to a predetermined amount of encoded data, in accordance with both of the first and the second amounts of encoded image data.

Another object of the present invention is to provide a structure capable of determining compression parameter by a simple structure.

In order to achieve the above-described object, according to an aspect of the present invention, there is provided an image processing apparatus comprising: input means for inputting image data; first quantizing means for quantizing the image data with a first quantizing step; second quantizing means for quantizing the image data with a second quantizing step; and third quantizing means for quantizing the image data with a third quantizing step, wherein the first, second and third quantizing means perform quantizing in parallel and the difference between the second quantizing step and the third quantizing step is larger than the difference between the first quantizing step and the second quantizing step on condition that the first quantizing step, the second quantizing step and the third quantizing step increases in this sequential order.

Another object of the present invention is to provide an algorithm for compressing a moving image which is freed from an interruption.

Another object of the present invention is to reduce the memory capacity.

Another object of the present invention is to satisfactorily reproduce an image.

Other and further objects, features and advantages of the invention will appear more fully from the following description.

DETAILED DESCRIPTION OF THE PREFERRED EMBODIMENTS

First Embodiment

A first embodiment of the present invention is characterized in that a control coefficient, with which a desired information quantity can be obtained, is obtained at the time of compressing a moving image in each image data, the desired information quantity being obtained in such a manner that N is made to be continuous integers, plural trials are perfomred in such a manner that the Nth control coefficient is small and as well as the N+1th control coefficient is large, and the desired information quantity is obtained by a primary approximation made with the information quantity generated by the trial performed by the Nth control coefficient and the information quantity generated by the trial performed by the N+1th control coefficient.

According to the above-described method, the quantity of compressed and generated information is made to be a predetermined value. Therefore, the capacity of the buffer memory can be reduced and will not be ruptured by the image can easily be designed. Furthermore, the control coefficient is not fed back, constant image quality can be obtained from the same image and as well as the frame joining, searching, editing functions and the like can easily be realized in a case where the transmission path comprises a recording medium such as a magnetic tape or a recording medium. In addition, in a case where the above-described technology is applied to a still image system which has no buffer memory and in which no feedback is performed, the time required to complete transmission of one image can be specified. Furthermore, the capacity required to record one image can be made to be a predetermined quantity.

Figure 1:
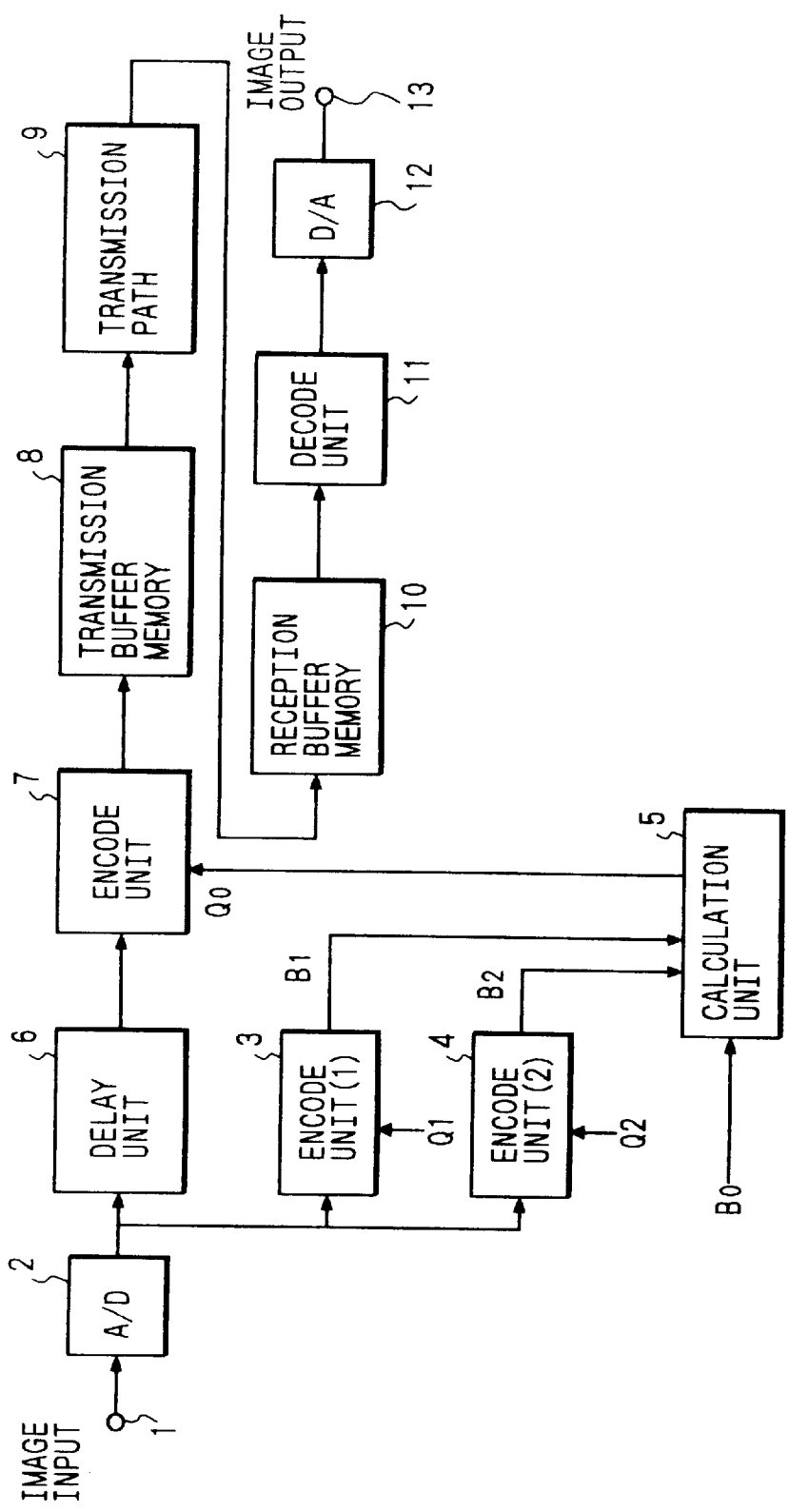
FIG. 1 is a structure block diagram which illustrates a first embodiment of the present invention.

Then, the embodiment of the present invention will now be described with reference to the drawings. FIG. 1 is a structural block diagram which illustrates an image processing apparatus according to the present invention. An image received from a video camera or a host computer or an image scanner or the like is A/D converted by an A/D converter 2 before it is variable-length encoded by an encoding unit (1) given reference numeral 3 by the above-described so-called ADCT system. At this time, control coefficient K is, as $Q_1$ which is a constant value, compressed for one frame of the image. As a result, compressed information quantity $B_1$ is obtained so as to be transmitted to a calculating unit 5.

Simultaneously, the image is also variable-length encoded by an encoding unit (2) given reference numeral 4 by the so-called ADCT system. At this time, control coefficient K is, as $Q_2$, which is a constant value, compressed for one frame of the image. As a result, compressed information quantity $B_2$ is obtained so as to be transmitted to a calculating unit 5. Reference numeral 6 represents an image data delay unit for delaying the image, which has been A/D-converted, by about one image frame.

Reference numeral 7 represents an encoding unit (0) for compressing and encoding the optimum control coefficient $K=Q_0$ calculated by a linear approximation of $Q_1$, $Q_2$, $B_1$ and $B_2$ in the calculating unit 5 so as to cause compressed and encoded data to be stored in a transmission buffer memory 8. Quantity $B_0$ of data compressed and encoded with the optimum control coefficient $K=Q_0$ is previously stored in a memory such as a ROM, a RAM and the like so as to be transmitted to the calculating unit 5 in which it is calculated.

Reference numeral 9 represents a transmission path comprising a transmission medium such as ground waves or an optical space or the like exemplified by an optical fiber, a satellite or microwaves in a case of the instantaneous transmission. If the same is the accumulated transmission, it is a storage medium such as a tape type medium exemplified by a digital VTR or a DAT or the like, a disc-like medium such as a floppy disk or an optical disk or the like or a solid medium such as a semiconductor memory.

The transmission rate is determined depending upon the quantity of information about the original image, the compression rate and a required transmission time such that it is varied from several tens of Kbits/second to several tens of Mbits/second.

On the other hand, data received through the transmission path 9 is temporarily stored in a receiving buffer memory 10 so that compressd and encoded data read from the receiving buffer memory 10 is extended and decoded in the decoding unit 11 with optimum control coefficient $Q_0$ which has been received simultaneously with the above-described data item. Then, it is digital-to-analog converted a D/A converting unit so that an image is transmitted through a terminal 13.

Figure 2:
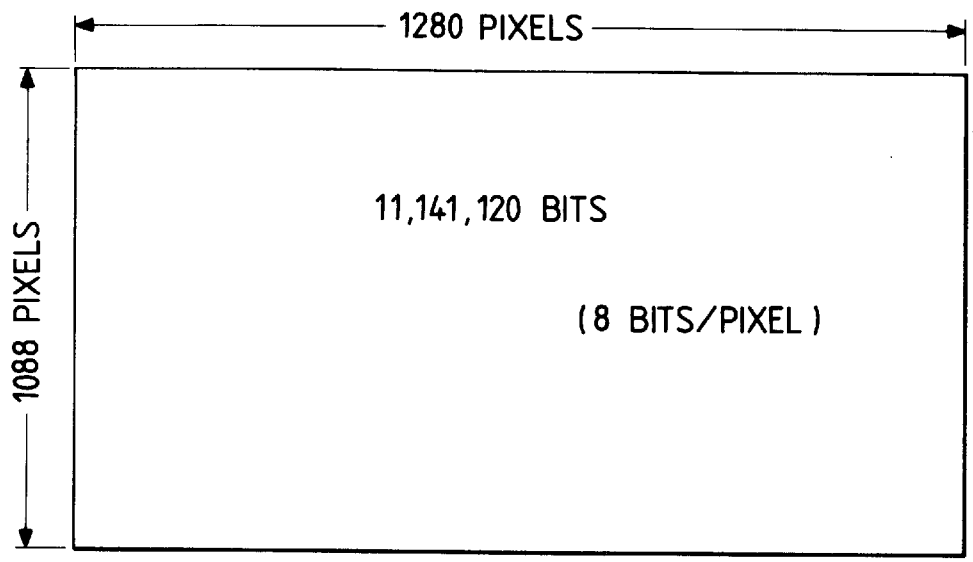
FIG. 2 illustrates an image to be transmitted in a structure according to the embodiment of the present invention.
Figure 3:
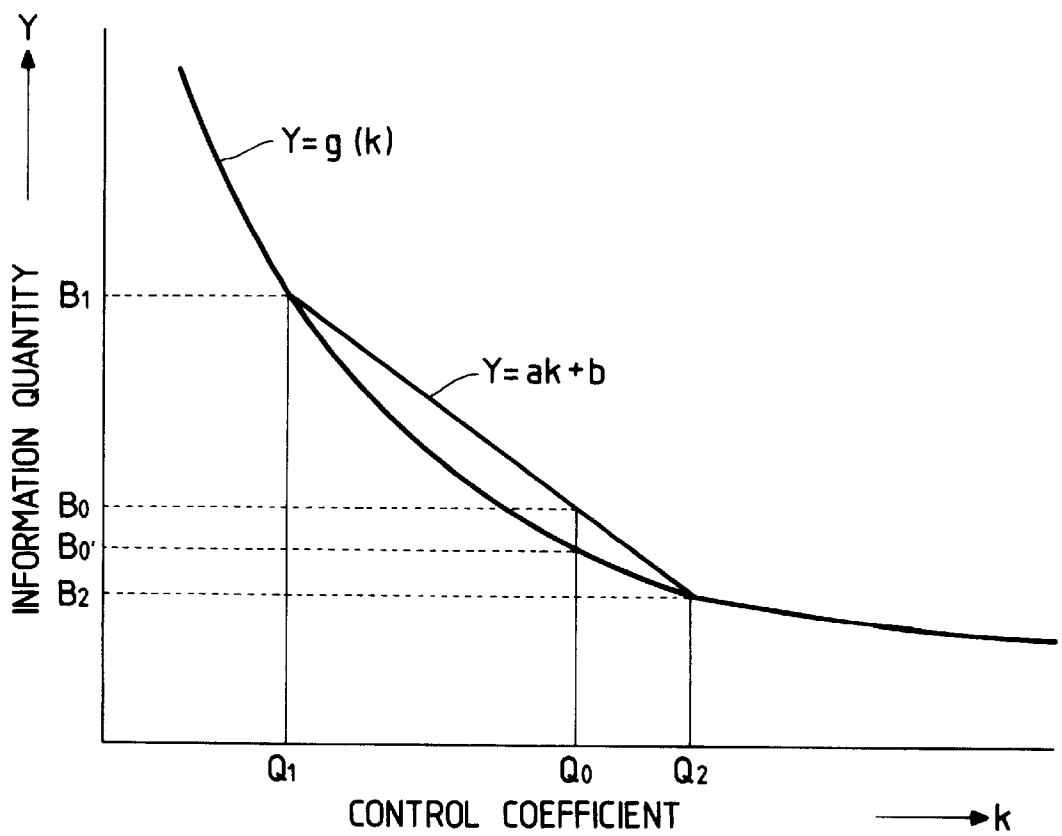
FIG. 3 illustrates a calculating method according to a first embodiment of the present invention.

Referring to FIGS. 2 and 3, the present invention will now be described in detail. FIG. 2 illustrates an example of an image to be transmitted, one frame of the image being an A/D converted image composed of 1280 pixels, each of which is constituted by 8 bits, in the horizontal direction and 1088 pixels in the longitudinal direction. The data capacity of one image is made of 1,280×1,088×8=11,141,120 bits. If the image is transmitted as a moving image at a speed of 30 frames/second a high speed transmission path capable of realizing 11,141,120×30=334,233,600 bits/second must be used.

On the other hand, the transmission path is usually arranged to act at a predetermined transmission rate. Therefore, an information quantity which exceeds the predetermined transmission rate will cause an interruption to occur and thereby the transmission cannot be made. Assuming that a transmission path, the transmission rate of which is 36.0000 Mbits/second, is used and as well as assuming that the redundant degree except for image information such as a sink code, an ID code and a parity is 5%, the transmission rate at which image information is able to be transmitted is 34.2000 Mbits/second and thereby the compressed information quantity for one image (one frame) is 1.1400 Mbits/frame. Therefore, the image for one frame must be compressed to a degree which is 10.23% or less. Furthermore, dummy data composed of the residual quantity: 1,140,000−(11,141,120×0.1023)=263.424 bits/frame, that is, 263.424×30=7,902.72 bits/second must be inserted.

Assuming that the control coefficient is a certain value and thereby the compressed information quantity of a certain image is 10%, the capacity of image information is 334,233,600×0.1=33,423,360 bits/seconds and thereby dummy data of 34,200,000−(334,233,600 ×0.1)=776,640 bits/second must be inserted.

Assuming that the control coefficient is a certain value and thereby the compressed information quantity of a certain image is 11%, the capacity of image information is 334,233,600×0.11=36,765,696 bits/seconds and thereby dummy data of 34,200,000−(344,233,600×0.1)=−2,565,696 bits/second which exceeds the transmission rate of the transmission path, causing an interruption to occur.

Therefore, it is necessary to constitute a structure in such a manner that the target compression rate is made to be 10.23% and optimum control coefficient $Q_0$ is given to the encoding unit (0) given reference numeral 7 shown in FIG. 1 in order to obtain an approximate value which does not exceeds the target compression rate 10.23%.

FIG. 3 illustrates a process of determining optimum control coefficient $Q_0$, wherein a case in which the information quantity is compressed and encoded to about 1/10 by the so-called ADCT system is illustrated.

Figure 8:
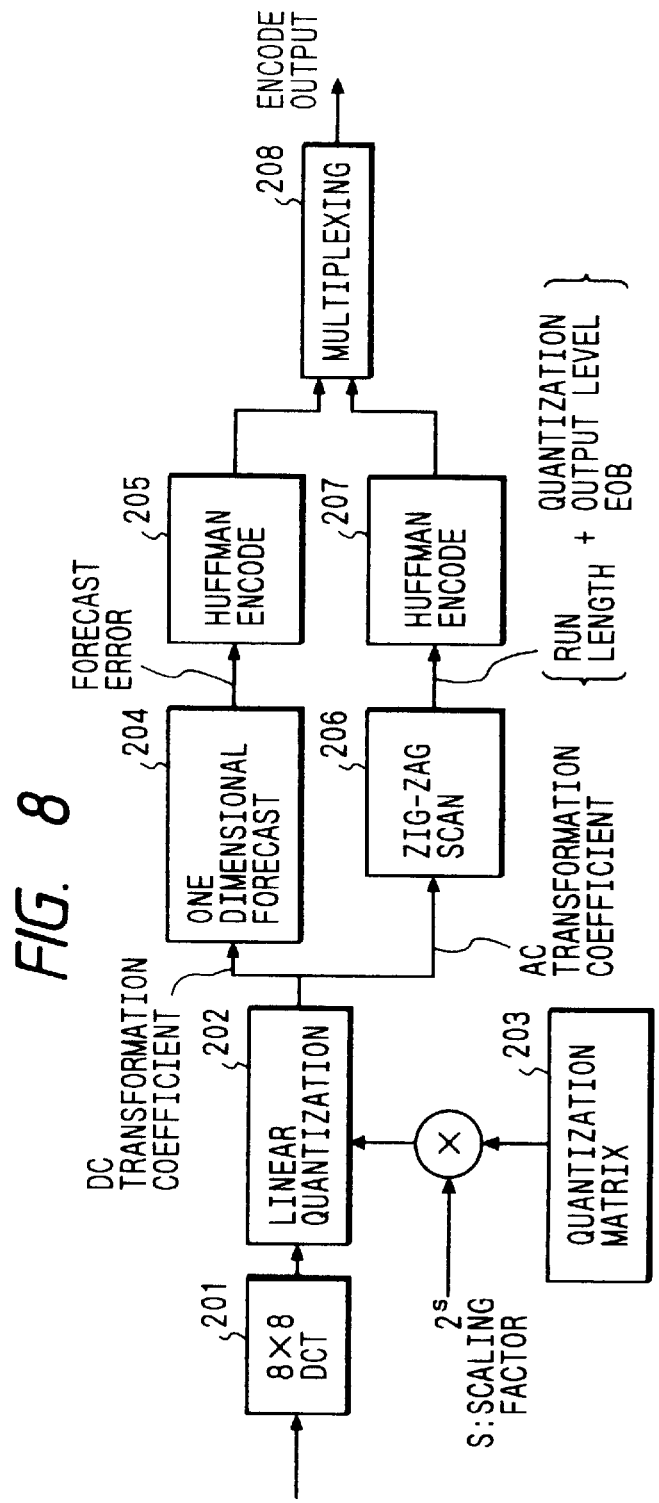
FIG. 8 illustrates an ordinary variable-length encoding system.
Figure 9:
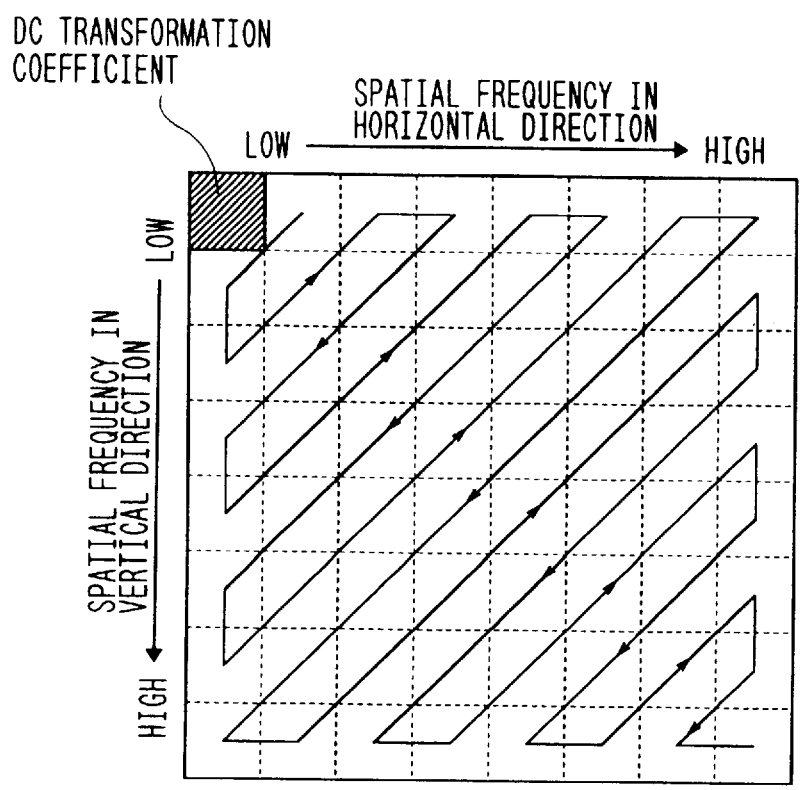
FIG. 9, in detail, illustrates the ordinary variable-length encoding system.

The encoding system is arranged to be similarly to that shown in FIG. 8 such that 8 horizontal pixels×8 longitudinal pixels are collected into a DCT sub-block and the DCT conversion is performed in units of the DCT sub-blocks before the conversion coefficient is linearly quantized. Each conversion coefficient has a different quantizing step size which is made to be a value obtained by multiplying an 8×8 quantization matrix element shown in Table 1 by K, the 8×8 quantization matrix being employed while taking the difference in each conversion coefficient of the visual sensitivity for sensing the quantization noise into consideration. The value of K is used to control the image quality and the quantity of generated data so that the above-described desired compression ratio of about 1/10 is realized. After the quantization has been completed, a DC conversion component is, as a subtraction value from zero, subjected to a one-dimensional forecasting between adjacent sub-blocks. Then, the forecasted error is huffman-encoded. Then, the quantization output denoting the forecasted error is divided into groups so that the identification number of a group which includes the forecasted error is huffman-encoded before the value of the quantization output in the group is expressed by an isotonic code. AC conversion component except for the DC component is encoded in such a manner that the above-described quantization output is zigzag scanned from the low frequency component to the high frequency component. That is, the significant coefficients are classified into groups depending upon their values and the identification number of the group and the number of the invalid coefficients held between significant coefficients positioned in front of it are caused to form a pair so as to be huffman encoded. At this time, two control coefficients $Q_1$ and $Q_2$ are selected and relationships $Q_1<Q_0$ and $Q_0<Q_2$ are held.

FIG. 3 illustrates the relationship between control coefficient K for an ordinary one image frame and compressed information quantity Y. The above-described relationship between Y and K is expressed by function g, that is, Y=g (K), where function g is considered such that it extremely approximates a log curve expressed by:

$$Y=g\ (K)=p\ \log K+q \text{ (where p and q are constants)} \quad (1)$$

Then, encoding of control coefficient $Q_1$ is performed in the encoding unit (1) given reference numeral 3 shown in FIG. 1 so that compressed information quantity $B_1$ is obtained.

Furthermore, encoding of control coefficient $Q_2$ is performed in the encoding unit (2) given reference numeral 4 shown in FIG. 1 so that compressed information quantity $B_2$ is obtained.

In the calculating unit 5 shown in FIG. 1, a straight line Y=aK+b (wherein a and b are constants) which connects two points ($Q_1$, $B_1$) and ($Q_2$, $B_2$) is calculated.

$$Y = \frac{B_1 - B_2}{Q_1 - Q_2} \cdot K + \frac{Q_2 \cdot B_1}{Q_2 - Q_1} - \frac{Q_1 \cdot B_2}{Q_2 - Q_1} \quad (2)$$

Transformation is performed so that the following equation is obtained:

$$K = \frac{(Q_2 - Q_1) \cdot Y - Q_2 \cdot B_1 + Q_1 \cdot B_2}{B_2 - B_1} \quad (3)$$

Then, by making $B_0$ shown in FIG. 3 to be the desired copression ratio (10.23%) so that optimum control coefficient $Q_0$ can be obtained by substituting B into Y in Equation (3).

$$Q_0 = \frac{(Q_2 - Q_1)B_0 - Q_2 \cdot B_1 + Q_1 \cdot B_2}{B_2 - B_1} \quad (4)$$

Actually, since the compressed information quantity generated with optimum control coefficient $Q_0$ is a value on Y=g (K), it is $B_0$. Since equation (1) is a downward-convex log curve, the straight, which connects two points on the downward-convex curve, necessarily is positioned on this curve as shown in FIG. 3. This means a fact that: $B_0>B$ so that the desired compression ratio is not exceeded in any case. Therefore, the risk of a rupture can be eliminated.

Since $Q_1$, $Q_2$ and $B_0$ of Equation (4) are known constant values and therefore it is necessary to be capable of obtaining only $B_1$ and $B_2$ by a trial of encoding. Therefore, the encoding units (1) and (2) respectively given reference numerals 3 and 4 shown in FIG. 1 are required to generate only the compressed information quantity.

Although the calculating unit 5 shown in FIG. 1 calculates the above-described Equation (4), the calculation may be performed by using a CPU or a look-up table which uses a ROM or a RAM or the like.

Although the above-described embodiment is arranged in such a manner that the relationship between the control coefficients and the compressed information quantities are expressed by a log curve, the actual relationship is sometimes different from this such that it can sometimes be approximated by a quadratic curve or a tertiary curve depending upon the way of the quantization and the type of encoding employed in the encoding unit. However, any of the cases are commonly characterized in that each curve is a downward-convex curve (the tangent is always present below the curve). Therefore, the above-described method of determining the control coefficient can be effectively employed because of the above-described characteristics.

Second Embodiment

Figure 4:
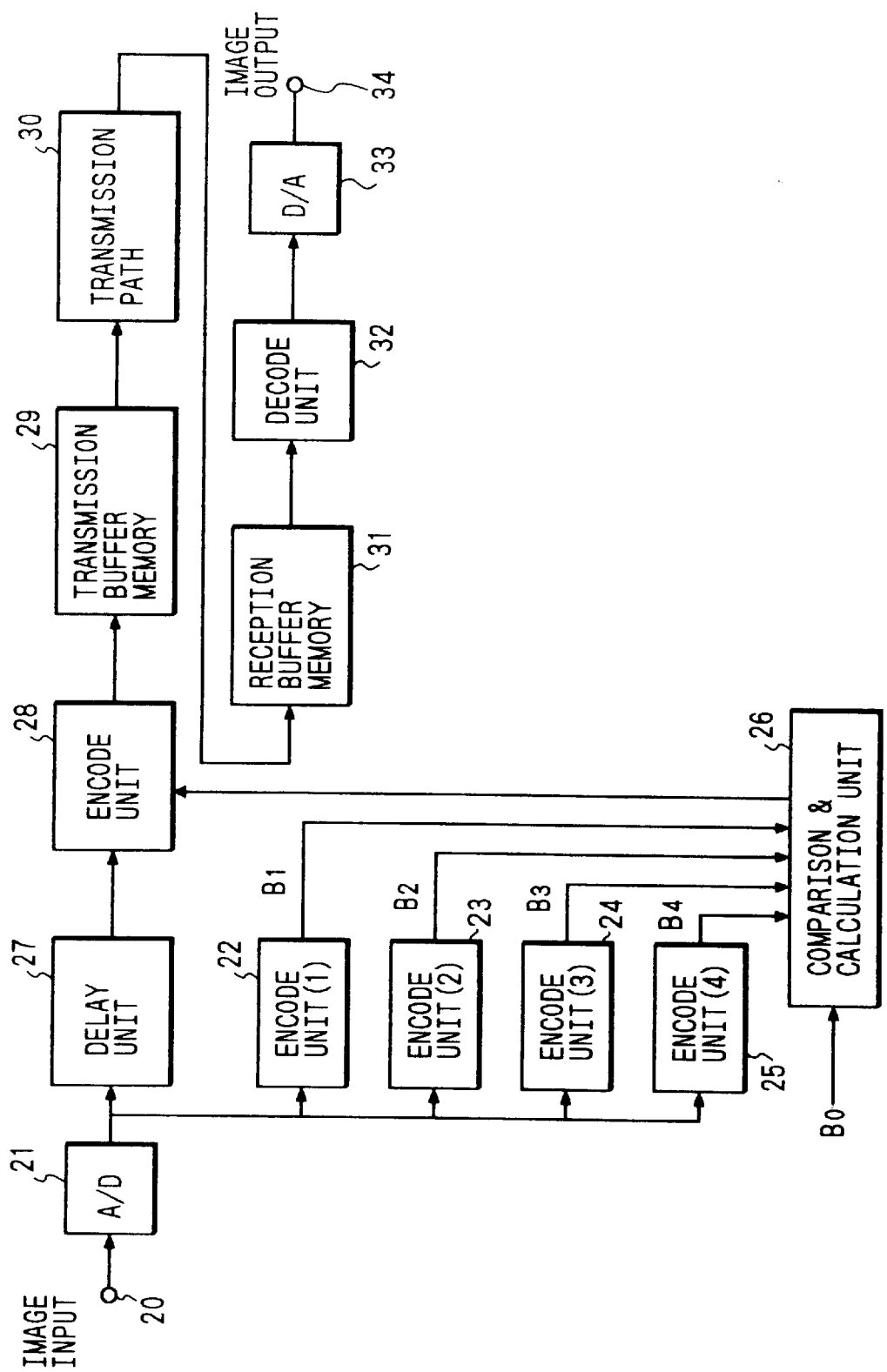
FIG. 4 is a structure view which illustrates a second embodiment of the present invention.

FIG. 4 is a structural block diagram which illustrates a second embodiment of the image encoding apparatus according to the present invention. An image received through a terminal 20 is A/D converted by an A/D converter 21 before it is variable-length encoded by an encoding unit (1) given reference numeral 22 by the above-described so-called ADCT system. At this time, control coefficient K is, as $Q_1$ which is a constant value, compressed for one frame of the image. As a result, compressed information quantity $B_1$ is obtained so as to be transmitted to a comparison and calculating unit 26. Simultaneously, the image is also variable-length encoded by an encoding unit (2) given reference numeral 23 by the so-called ADCT system. At this time, control coefficient K is, as $Q_2$, which is a constant value, compressed for one frame of the image. As a result, compressed information quantity $B_2$ is obtained so as to be transmitted to a comparison and calculating unit 26. The same is similarly variable-length encoded by an encoding unit (3) given reference numeral 24 by the so-called ADCT system. At this time, control coefficient K is, as $Q_3$, which is a constant value, compressed for one frame of the image. As a result, compressed information quantity $B_3$ is obtained so as to be transmitted to the comparison and calculating unit 26. Furthermore, the same is similarly variable-length encoded by an encoding unit (4) given reference numeral 25 by the so-called ADCT system. At this time, control coefficient K is, as $Q_4$, which is a constant value, compressed for one frame of the image. As a result, compressed information quantity $B_4$ is obtained so as to be transmitted to the comparison and calculating unit 26.

Reference numeral 27 represents an image data delay unit for delaying the image, which has been A/D-converted, by about one image frame. Reference numeral 28 represents an encoding unit (0) for compressing and encoding the optimum control coefficient $K=Q_0$ calculated by the comparison and calculating unit 26 so as to cause compressed and encoded data to be stored in a transmission buffer memory 29.

Reference numeral 30 represents a transmission path. Data received through the transmission path 30 is temporarily stored in a receiving buffer memory 31. Compressed and encoded data read from the receiving buffer memory 31 is, in the encoding and decoding unit 32, extended and decoded with optimum control coefficient $Q_0$ which has been received simultaneously. Then, it is digital-to-analog converted in the D/A converter 33 so that an image is transmitted from a terminal 34.

Then, the second embodiment of the present invention will now be described with reference to FIGS. 5 and 6.

Then, a description will made with reference to a case in which an image to be transmitted is, as shown in FIG. 2, similar to that according to the above-described first embodiment and image for one frame is compressed to 10.23% or smaller, respectively.

That is, it is necessary to constitute a structure in such a manner that the target compression rate is made to be 10.23% and optimum control coefficient $Q_0$ is given to the encoding unit (0) given reference numeral 28 shown in FIG. 4 in order to obtain an approximate value which does not exceeds the target compression rate 10.23%.

Figure 5:
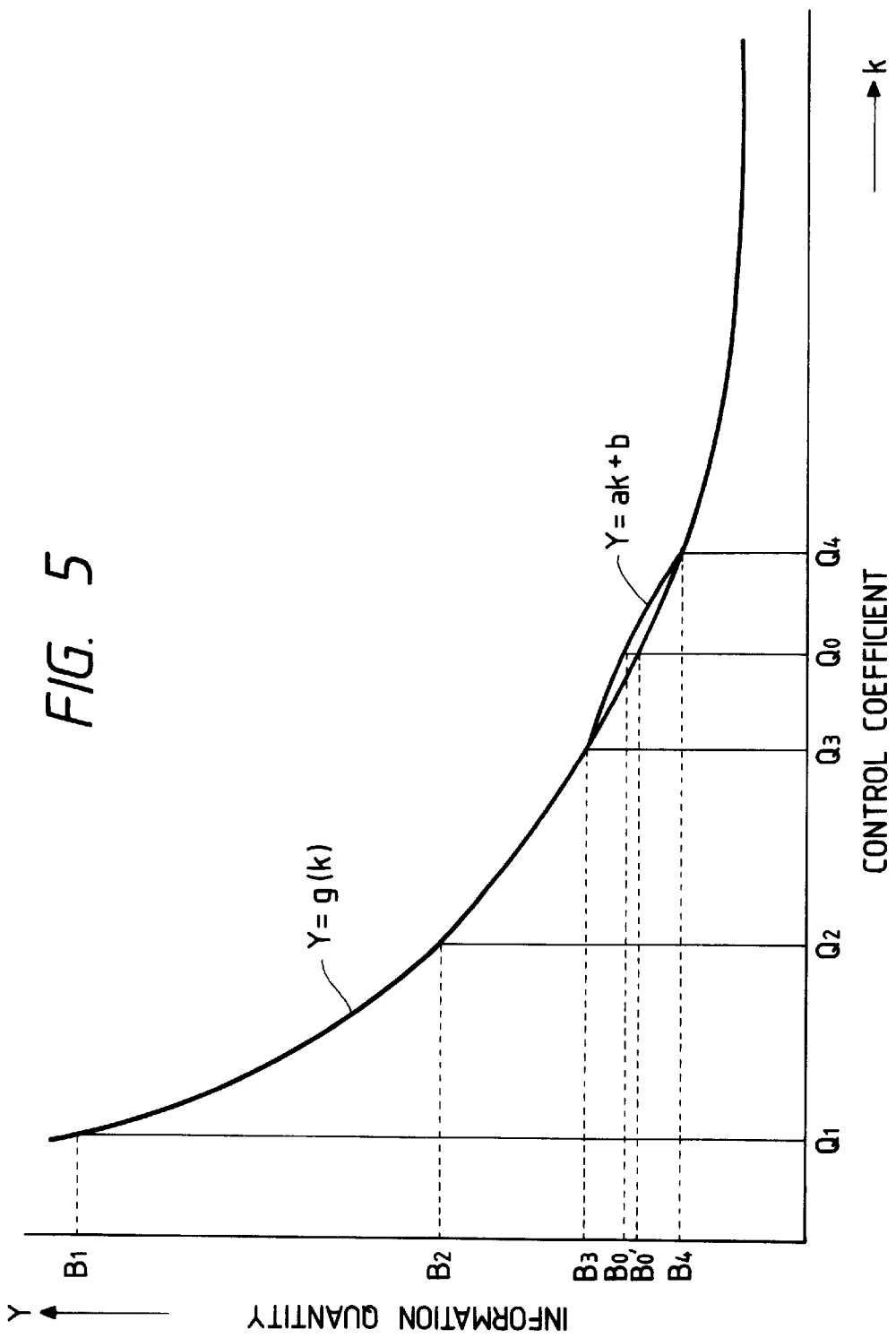
FIG. 5 illustrates a calculating method according to a second embodiment of the present invention.

FIG. 5 illustrates a process or determining optimum control coefficient $Q_0$.

The encoding system si arranged to employ the so-called ADCT system shown in FIG. 8 similarly to the first embodiment.

Then, an assumption is made that four control coefficients $Q_1$, $Q_2$, $Q_3$ and $Q_4$ are selected which hold relationships $Q_1 < Q_0$ and $Q_0 < Q_4$.

FIG. 5 illustrates the relationship between control coefficient K for an ordinary one image frame and compressed information quantity Y. The above-described relationship between Y and K is expressed by function g, that is, Y=g (K).

In this state, Y=g (K) approximates a log curve.

Then, encoding of control coefficient $Q_1$ is performed in the encoding unit (1) given reference numeral 22 shown in FIG. 4 so that compressed information quantity $B_1$ is obtained. Encoding of control coefficient $Q_2$ is performed in the encoding unit (2) given reference numeral 23 shown in FIG. 4 so that compressed information quantity $B_2$ is obtained. Encoding of control coefficient $Q_3$ is performed in the encoding unit (3) given reference numeral 24 shown in FIG. 4 so that compressed information quantity $B_3$ is obtained. Encoding of control coefficient $Q_4$ is performed in the encoding unit (4) given reference numeral 25 shown in FIG. 4 so that compressed information quantity $B_4$ is obtained. Then, the flow of the comparison and calculating unit 26 shown in FIG. 4 will now be described with reference to FIG. 6.

In the comparison and calculating unit 26 shown in FIG. 4, target compression information quantity $B_0$ is subjected to comparisons with $B_1$, $B_2$, $B_3$ and $B_4$ obtained by the above-described compressing and encoding trial such that $B_0 \leq B_1$, $B_0 \leq B_2$, $B_0 \leq B_3$ and $B_0 \leq B_4$, respectively (steps S1 to S4) so as to obtain N with which $B_0$ holds a relationship $B_N \leq B_0 \leq B_{N+1}$ (wherein N is a positive integer) (steps S5 to S7). If N is obtained, an error takes place in the subject case (step S9).

At the time at which N is detected, straight line Y=aK+b (where a and b are constants) which connects $(Q_N, B_N)$ and $(Q_{N+1}, B_{N+1})$ to each other is calculated in the comparison and calculating unit 26 shown in FIG. 4. As a result, control coefficient K is obtained from Equation (5):

$$K = \frac{(Q_{N+1} - Q_N) \cdot Y - Q_{N+1} \cdot B_N + Q_N \cdot B_{N+1}}{B_{N+1} - B_N} \qquad (5)$$

Then, by making $B_0$ shown in FIG. 5 to be the desired compression ratio (10.23%) so that optimum control coefficient Q can be obtained by substituting $B_0$ into Y in Equation (5).

$$Q_0 = \frac{(Q_{N+1} - Q_N) \cdot B_0 - Q_{N+1} \cdot B_N + Q_N \cdot B_{N+1}}{B_{N+1} - B_N} \qquad (6)$$

Actually, since the compressed information quantity generated with optimum control coefficient $Q_0$ is a value on Y–g (K), it is $B_0$. This means a fact that: $B_0 > B_0$ so that the desired compression ratio is not exceeded in any case. Therefore, the risk of an interruption in the transmission path can be prevented.

Among the above-described values, $Q_1$, $Q_2$, $Q_3$, $Q_4$ and $B_0$ are known constant values in the apparatus and therefore it is necessary to be capable of obtaining only $B_1$, $B_2$, $B_3$ and $B_4$ by the trial of encoding. Therefore, the encoding units (1), (2), (3) and (4) given reference numerals 22, 23, 24 and 25 shown in FIG. 4 are required to generate only the compressed information quantity.

Although the above-described Equation (6) is calculated in the above-described comparison and calculating unit 26 shown in FIG. 4, the calculation may be performed by using a CPU or the like or a look-up table which uses a ROM or a RAM or the like. Although the above-described second embodiment is arranged in such a manner that the number of the encoding units for generating only the encoded information quantity is made to be four, the above-described number can be increased, resulting an effect to be obtained in that the optimum control coefficient infinitely approximates the desired compressed information quantity while being limited to be smaller than the same. As a result, encoding can efficiently be performed. Therefore, the present invention is not limited to the above-described number of the encoding units. Furthermore, although the above-described ordinary encoding system as shown in FIG. 8 is employed in the encoding unit for the purpose of easily making the description, another encoding system may be employed. In addition, in the above-described case, the DCT unit shown in FIG. 8 is commonly employed in the encoding units. Therefore, the necessity of possessing the same by a plurality of numbers and therefore they can be unified into one unit.

The frequency conversion is not limited to the DCT but another orthogonal conversion such as the Adhamal conversion or the like may be employed.

In addition, the present invention is not limited to the block size arranged to be 8×8 pixels.

Furthermore, the encoding method after the quantization has been completed is not limited to the Huffman encoding method. For example, an arithmetical encoding method or a run-length encoding method may be employed.

In addition, the present invention is not limited to the primary approximation but a structure in which an approximation of the linear approximation is employed is included in the scope of the present invention.

As described above, according to the present invention, the quantity of compressed data can satisfactorily be controlled.

Third Embodiment

A third embodiment of the present invention comprises a means for obtaining a desired information quantity at the time of performing compressing of each image data for one frame in such a manner that the control coefficient with which the desired information can be obtained is processed such that N is made to be continuous integers, plural trials are performed in such a manner that the N th control coefficient is small and as well as the N+1 th control coefficient is large, and the desired information quantity is obtained by a primary approximation made with the information quantity generated by the trial performed by the N th control coefficient and the information quantity generated by the trial performed by the N+1 th control coefficient.

In addition, the structure of the third embodiment is characterized by a means for deforming the first-order term or the zero order term or the zero order term and the first-order term of the obtained primary approximation.

The basic block structure according to this embodiment is arranged to be similarly to that shown in FIG. 1.

Figure 10:
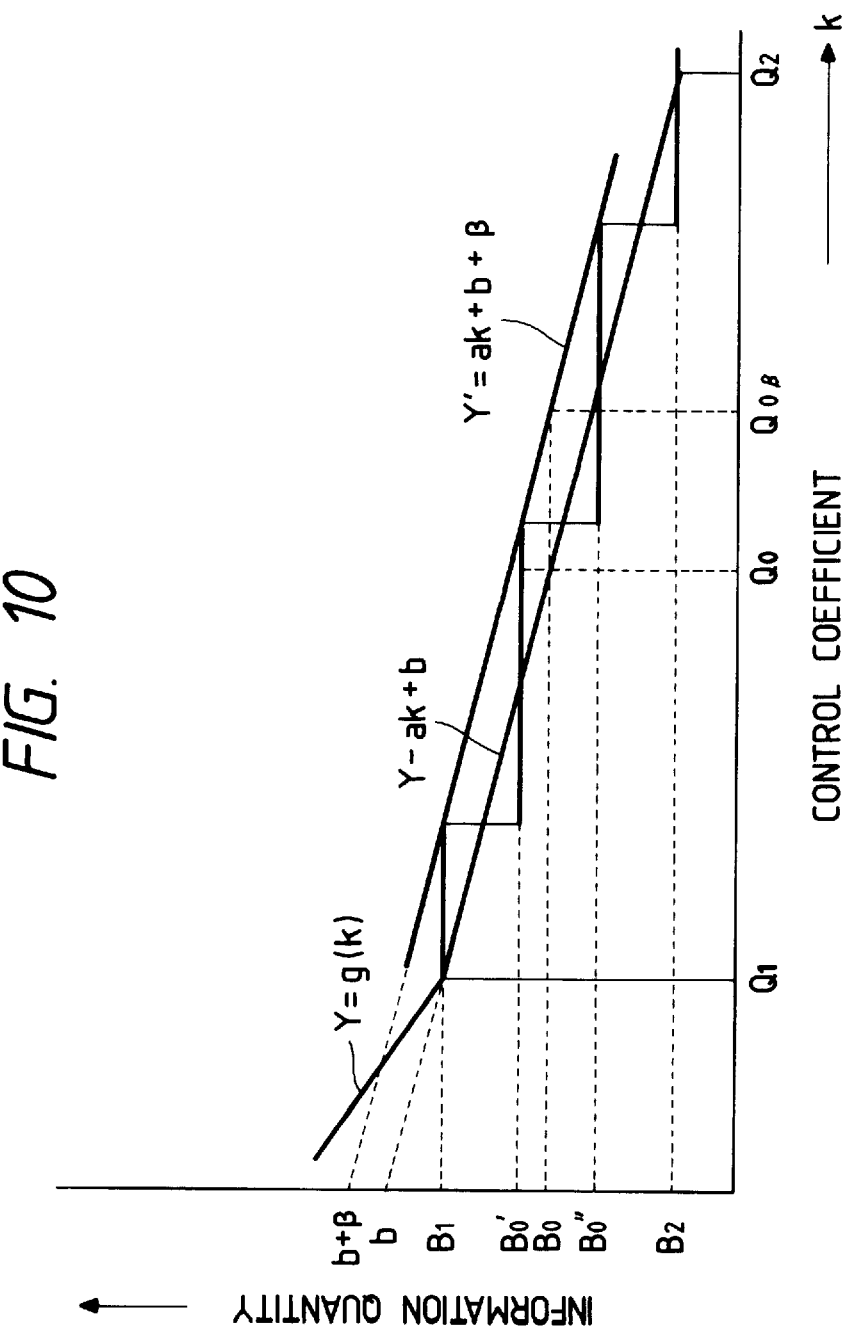
FIG. 10 illustrates the relationship between control coefficients and information quantities.

FIG. 10 illustrates a case in which control coefficient K and information quantity Y hold a special relationship.

In a case where the information quantities when the quantization is performed with control coefficients $Q_1$ and $Q_2$ are $B_1$ and $B_2$ respectively and as well as the original information quantity is $B_0$, the control coefficient when the same is obtained by linear approximation $Y=aK+b$ as shown in FIG. 10 becomes $Q_0$. Furthermore, actual information $B_0'$ when the quantization is performed with control coefficient $Q_0$ holds a relationship $B_0'>B_0$, causing a rupture to occur.

Therefore, by adding predetermined information quantity β (a constant) to approximation $Y=aK+b$ obtained with information quantities $B_1$ and $B_2$, approximation $Y'=aK+b+β$ can be obtained. Then, quantization with control coefficient $Q_0β$ obtained with desired information quantity $B_0$ is performed so that the actual information quantity becomes $B_0''$. As a result, a relationship $B_0''<B_0$ and thereby the quantity becomes information quantity $B_0$ or less. Therefore, information can be quantized and compressed so as to be transmitted while preventing an interruption.

Since $Y=g(K)$ is, in FIG. 10, ordinarily a downward convex, it is preferable that the above-described constant β holds a relationship β>0. By adding β thus-determined, the possibility of occurrence of a rupture can be decreased. The structure may be arranged in such a manner that β is set manually to the calculating unit 5 in accordance with the supplied image or the same is automatically set in accordance with the characteristics of the image.

Figure 11:
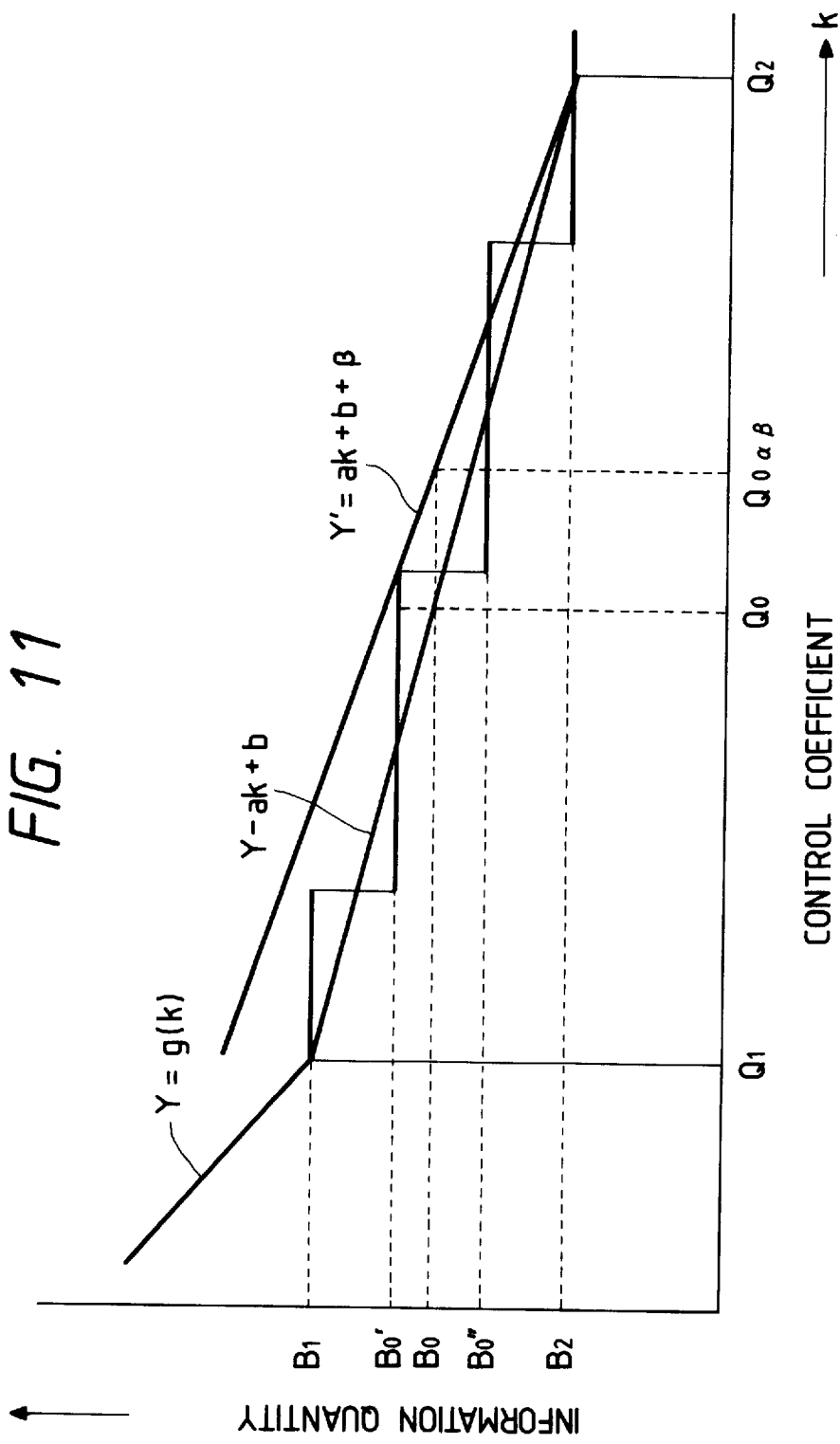
FIG. 11 illustrates the relationship between control coefficients and information quantities.

FIG. 11 illustrates control coefficient K and information quantity Y in a case where approximation $Y=aK+b$ shown in FIG. 10 is transformed (amended) into $Y'=(a+α)K+b+β$. As described with reference to FIG. 3, by performing quantization with desired information quantity $B_0$ and control coefficient $Q_0αβ$ obtained by approximation $Y=(a+α)K+b+β$, the actual information quantity becomes $B_0''$ which holds a relationship $B_0''<B_0$. Since the information quantity is desired information quantity $B_0$, quantization and compression can be performed so as to transmit information.

Furthermore, it is preferable that α holds a relationship α>0 similarly to β.

According to the above-described embodiment of the present invention, the above-described primary approximation is corrected. As a result, quantization compression can be performed while preventing a rupture even if the image is an image of a type in which the quantization control coefficient and the information quantity hold a special relationship.

Furthermore, the present invention is not limited to the primary approximation. For example, a structure in which a linear approximation or the like is employed is included in the scope of the present invention.

Fourth Embodiment

A fourth embodiment of the present invention is characterized in that a control coefficient, with which a desired information quantity can be obtained, is obtained at the time of compressing a moving image in each image data, the desired information quantity being obtained in such a manner that N is made to be continuous integers, plural trials are performed in such a manner that the N th control coefficient is small and as well as the N+1 th control coefficient is large, and the desired information quantity is obtained by a primary approximation made with the information quantity generated by the trial performed by the N th control coefficient and the information quantity generated by the trial performed by the N+1 th control coefficient.

Furthermore, the fourth embodiment is characterized in that, in a case where the desired information quantity is larger than the information quantity generated by the trial made with the first control coefficient as a result of the trial of a plurality of variable-length compressing and encoding with M-types of control coefficients, or in a case where the same is smaller than the information quantity generated by the trial made with the M th control coefficient, the control coefficient for variable-length encoding is encoded as a predetermined constant value.

Since the basic block structure according to this embodiment is the same as that shown in FIG. 1, its description is omitted here.

Figure 13:
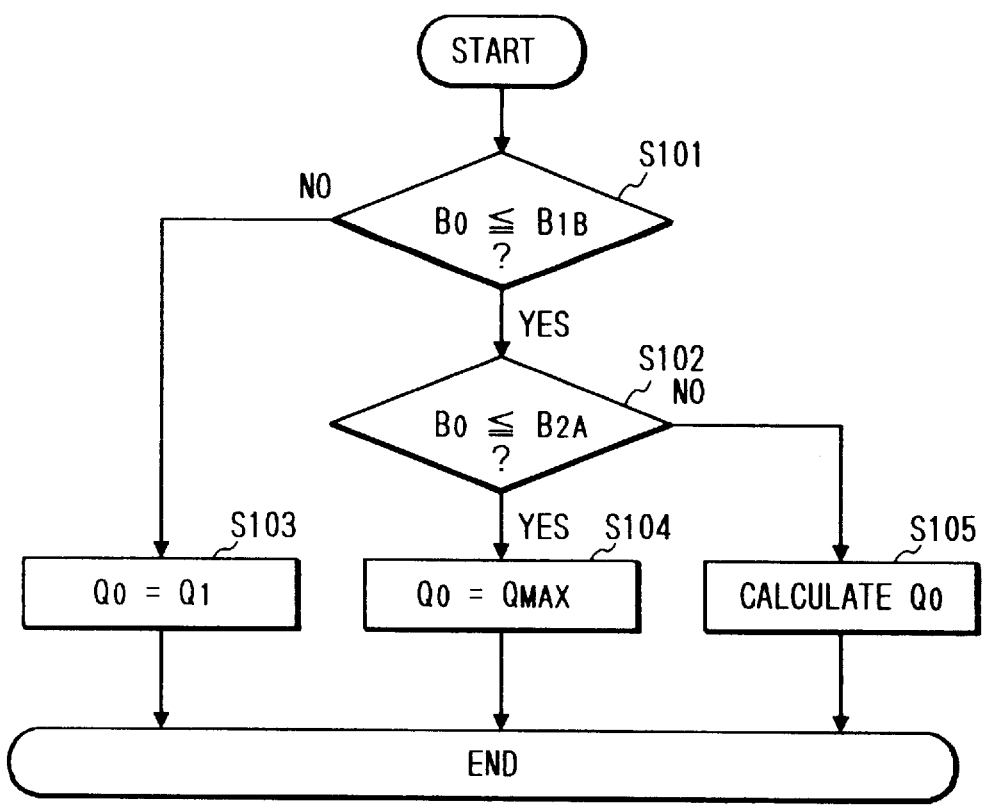
FIG. 13 illustrates a calculating flow according to the fourth embodiment of the present invention.

FIG. 13 is a flow chart for the calculation to be performed in the structure according to this embodiment.

Figure 12:
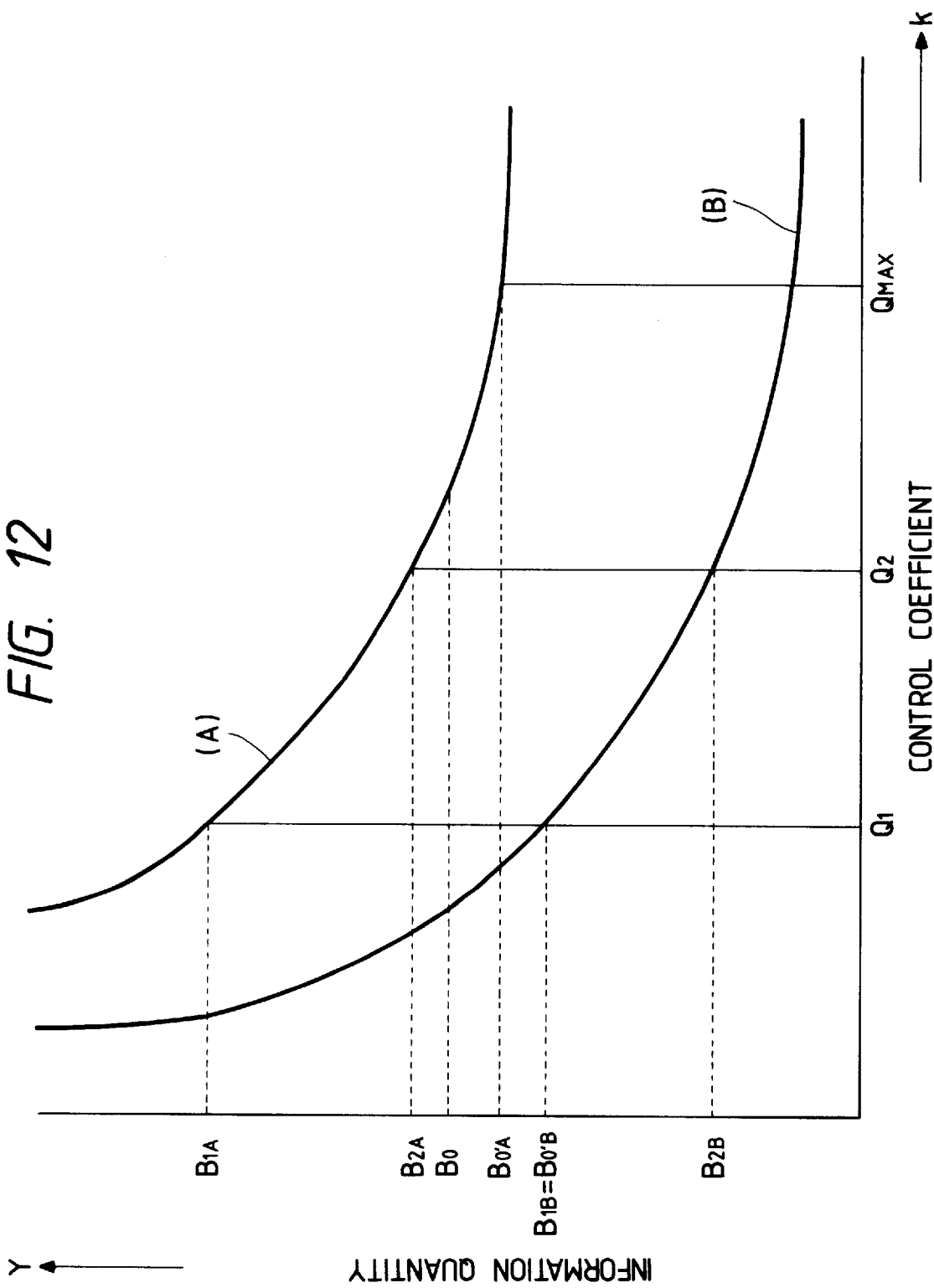
FIG. 12 illustrates a further-detailed calculating method according to a fourth embodiment of the present invention.

In a case where the image is very simple such as a color bar and the original information quantity is small as designated by a curve shown in FIG. 12, curve B, as a result of a trial performed by using two control coefficients $Q_1$ and $Q_2$ shown in FIG. 1, a relationship $B_0>B_{1B}$ is held (S101) and the calculating unit 5 shown in FIG. 1 transmits $Q_1$ to the encoding unit 7 while making $Q_0=Q_1$.

In a case where the image is, as designated by a curve shown in FIG. 12, curve A, very complicated such as a zone plate and the original information quantity is very large as a result of the trial performed by using two control coefficients $Q_1$ and $Q_2$, a relationship $B_0<B_{2A}$ is held (S102) and the calculating unit 5 shown in FIG. 1 transmits $Q_{MAX}-5$ to the encoding unit 7 while making $Q_0=Q_{MAX}=5$ (S104). In a case where $B_{2A}<B_0≦B_{1B}$, $Q_0$ is calculated similarly to the first embodiment (S105).

As a result, the desired compression ratio is not exceeded in any case and an interruption will not take place on the transmission path.

Fifth Embodiment

A fifth embodiment of the present invention is a modification to the second embodiment. Since the basic structure is the same as that shown in FIG. 4, its description is omitted here.

Figure 6:
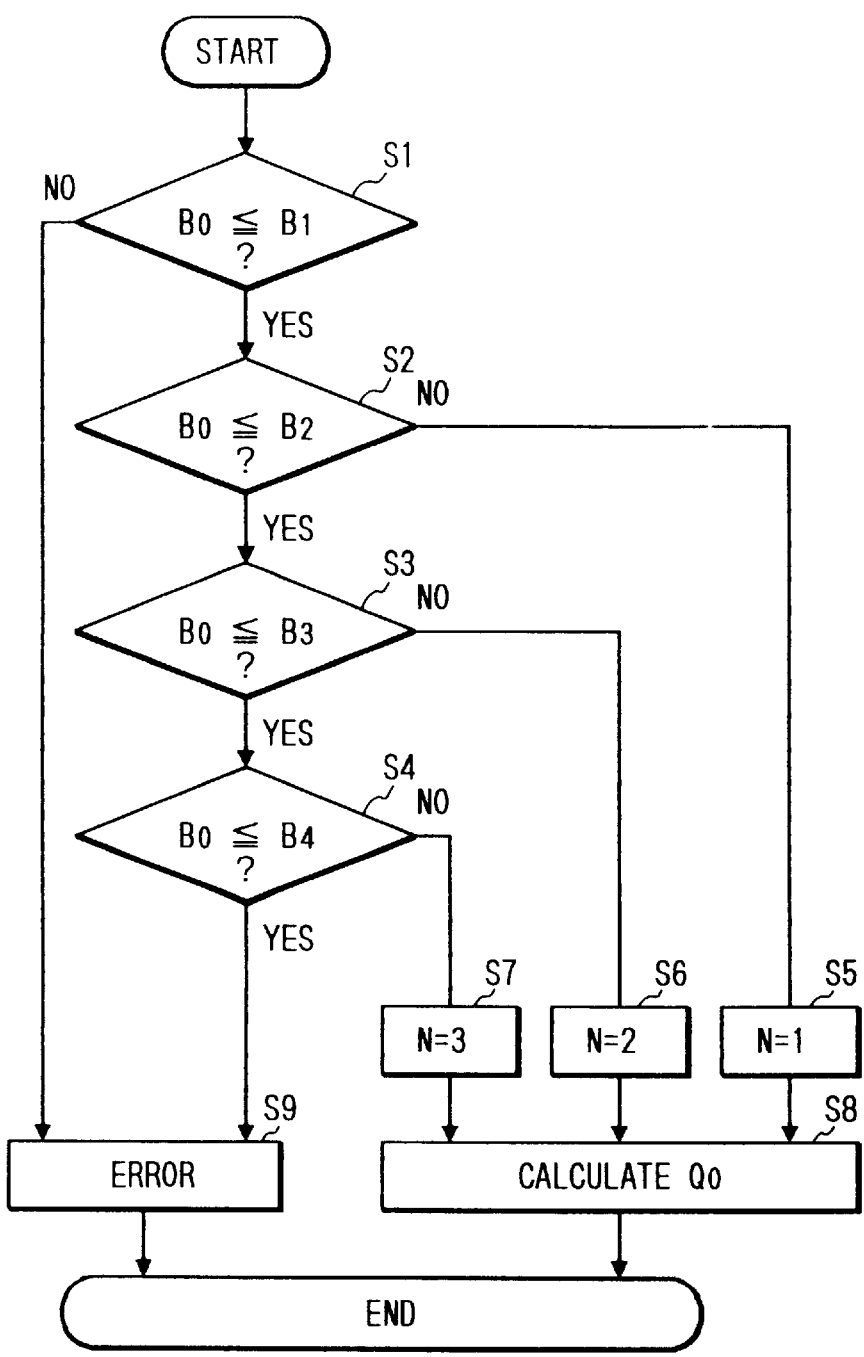
FIG. 6 illustrates a calculation flow according to a second embodiment of the present invention.
Figure 15:
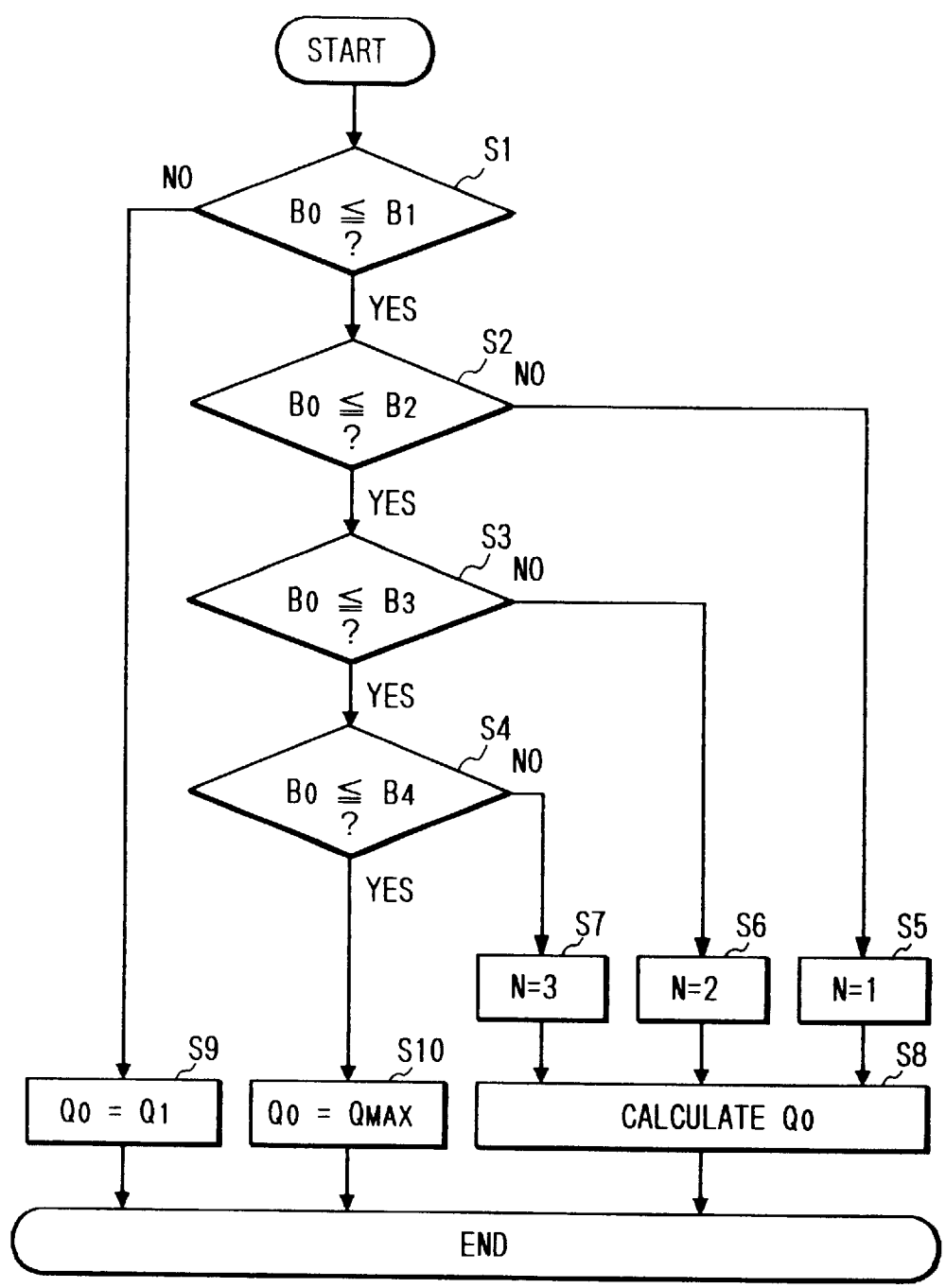
FIG. 15 illustrates a calculating flow according to the fifth embodiment of the present invention.

FIG. 15 is a flow chart for the calculation to be performed in the structure according to this embodiment, the flow chart being basically arranged to be the same as that shown in FIG. 6.

Figure 14:
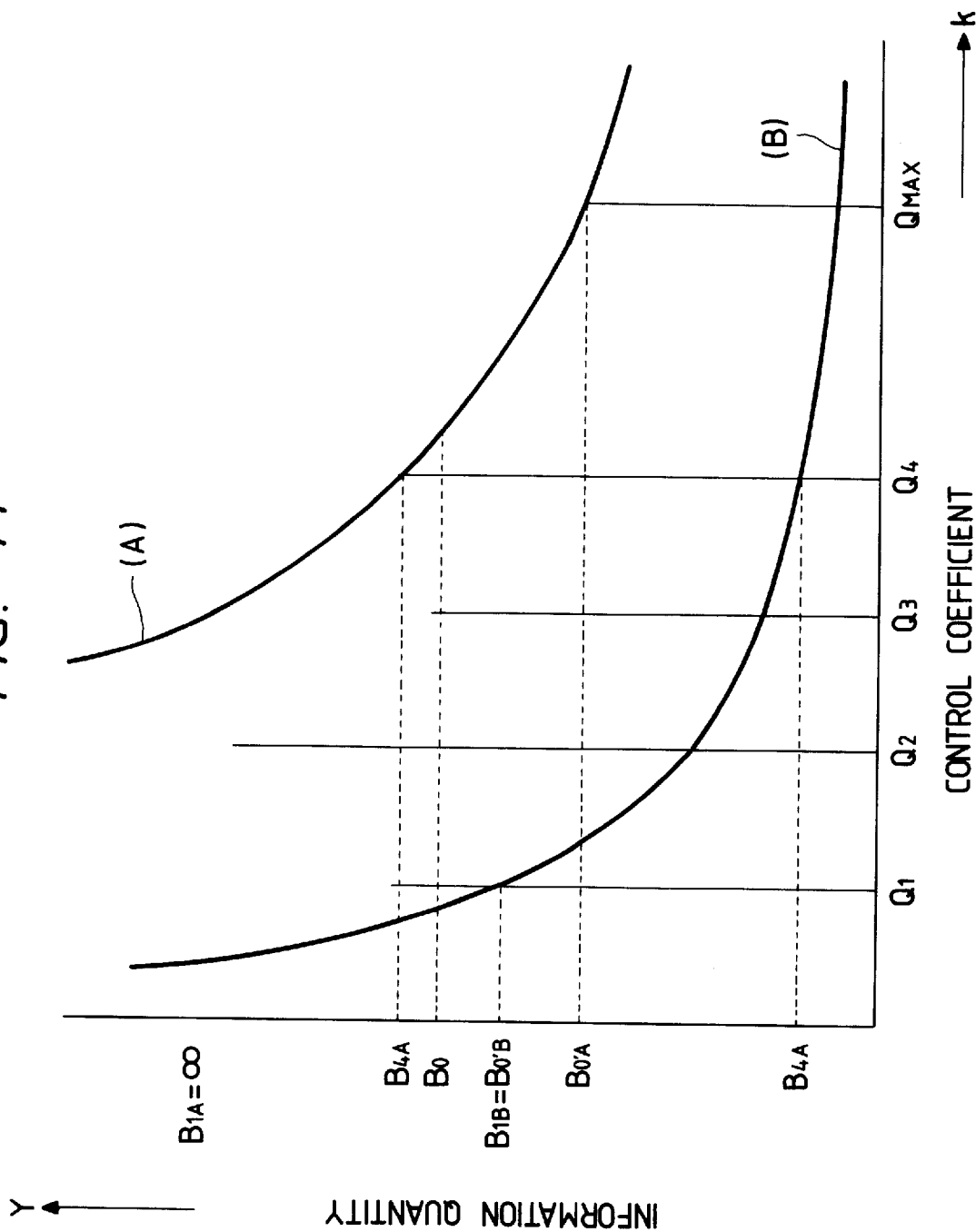
FIG. 14 illustrates a further-detailed calculating method according to a fifth embodiment of the present invention.

In a case where the image is very simple such as a color bar and the original information quantity is small as designated by a curve shown in FIG. 14, curve B, as a result of a trial performed by using four control coefficients $Q_1$, $Q_2$, $Q_3$ and $Q_4$ shown in FIG. 4, a relationship $B_0 > B_{1B}$ is held and the calculating unit 26 shown in FIG. 6 performs a transmission to the encoding unit 0 while making $Q_0 = Q_1$ (S9).

In a case where the image is, as designated by a curve shown in FIG. 14, curve A, very complicated such as a zone plate and the original information quantity is very large as a result of the trial performed by using four control coefficients $Q_1$, $Q_2$, $Q_3$ and $Q_4$, a relationship $B_0 < B_{4A}$ is held and the calculating unit 26 shown in FIG. 6 performs a transmission to the encoding unit 0 while making $Q_0 = Q_{MAX} = 5$ (S10).

Although the above-described embodiment is arranged in such a manner that the relationship between the control coefficients and the compressed information quantities are expressed by a log curve, the actual relationship is sometimes different from this such that it can sometimes be approximated by a quadratic curve or a tertiary curve depending upon the way of the quantization and the type of encoding employed in the encoding unit. However, any of the cases are commonly characterized in that each curve is a downward-convex curve (the tangent is always present below the curve). Therefore, the above-described method of determining the control coefficient can be effectively employed because of the above-described characteristics.

Sixth Embodiment

Figure 18:
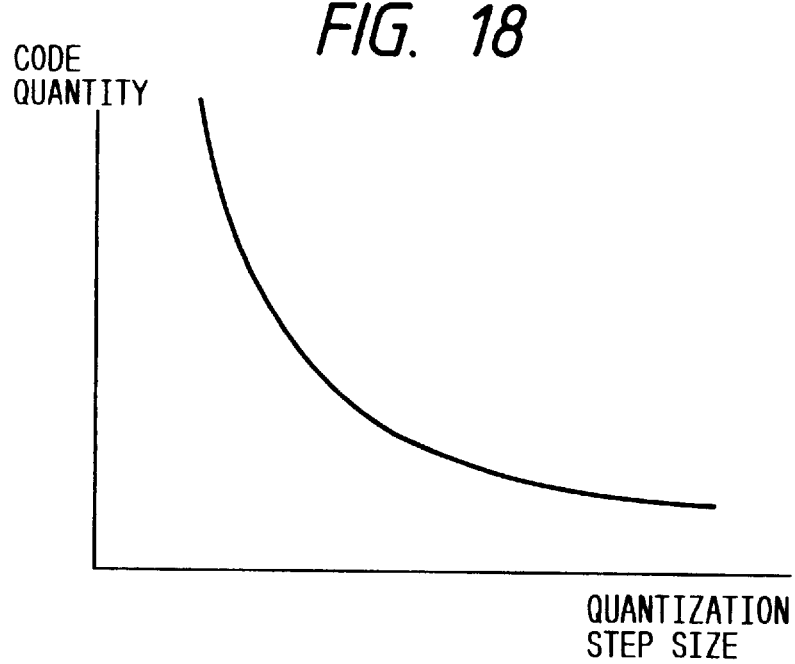
FIG. 18 illustrates a quantization process shown in FIG. 17.

In general, in a case where an image signal is transmitted, the transmission path possesses a transmission capacity per unit time. Therefore, it is preferable that, in a case where one frame must be transmitted at a predetermined moment as a case of a moving image, the quantity of the code to be transmitted be a quantity fixed in units of frames or image blocks. Although the overall quantity of the code can be adjusted by changing the quantization step coefficient in the quantization process, the quantization step coefficient must be forecasted in order to cause the overall quantity of encoded data to be included in the set code quantity because the quantity of encoded data is different depending upon the image. The relationship between the above-described quantization step coefficient and the overall quantity of the encoded data establish a monotone decreasing function. Furthermore, an average image is expressed by a logarithmic curve as shown in FIG. 18.

As a method of estimating the quantization step size by utilizing the above-described characteristics, there has, according to the above-described embodiments, been suggested a method in which the quantization step coefficient is processes from the quantization to VLC at each of a plurality of different points, the quantity of the code at each point is measured and the primary approximation between the measuring points is performed.

Figure 19:
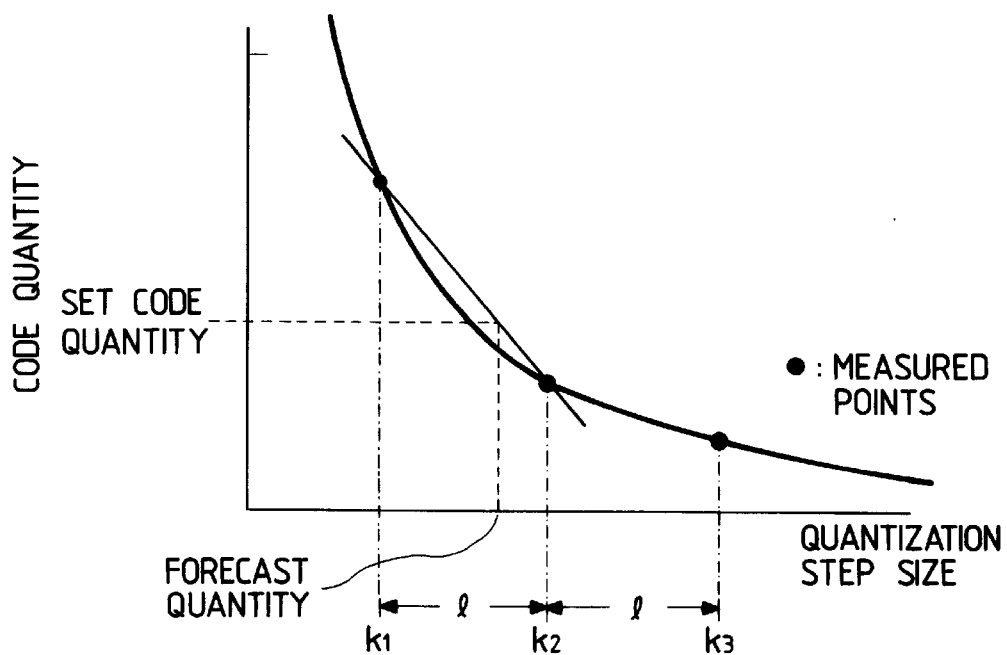
FIG. 19 illustrates a quantization process shown in FIG. 17.

FIG. 19 illustrates the above-described method of estimating the quantization step size. As described above, the quantization step coefficient is measured at a plurality of the measuring points and the region between the measuring points is discriminated. Then, the region between the two measuring points and indicating the discriminated region is primary-approximated so that the quantization step coefficient is estimated.

However, the above-described method encounters a problem in that many measuring points must be provided in order to reduce the error from the set quantity of the code, the plurality of measurement operations must be performed in parallel in order to shorten the time required to complete the treatment and the size of hardware of the apparatus cannot be reduced if the number of the measuring points is increased in order to improve the accuracy of the measured results.

According to this embodiment to be described later, there is provided an encoding apparatus for quantizing conversion data obtained by converting image information into a reading frequency region in units of blocks composed of a plurality of pixels and for variable-length encoding quantized conversion data, the encoding apparatus comprising means for measuring the quantity of code by, in parallel, performing quantization to variable-length encoding (VLC) with a predetermined plural quantization step coefficients, and a calculating means for, from the measured quantity of the code, estimating a quantization step coefficient for a desired quantity of the code by a linear approximation, wherein the interval between the points at each of which the quantity of the code is measured are widened in proportion to the quantization step coefficient.

Since the structure is constituted in such a manner that the interval between the points at each of which the quantity of the code is measured is set as described above, the approximation error of the estimated quantization quantity can be relatively approximated to a constant value in comparison to a case in which the measuring points are equally disposed with respect to the quantization step coefficient. In particular, in a case where the quantity of the quantized code is large, the interval between the measuring points can be narrowed. Therefore, an effect can be obtained in that the approximation error of the above-described estimated quantization quantity can be reduced. As a result, the estimation accuracy of the quantity of the quantized code can be improved while necessitating a small number of measuring points.

Figure 16:
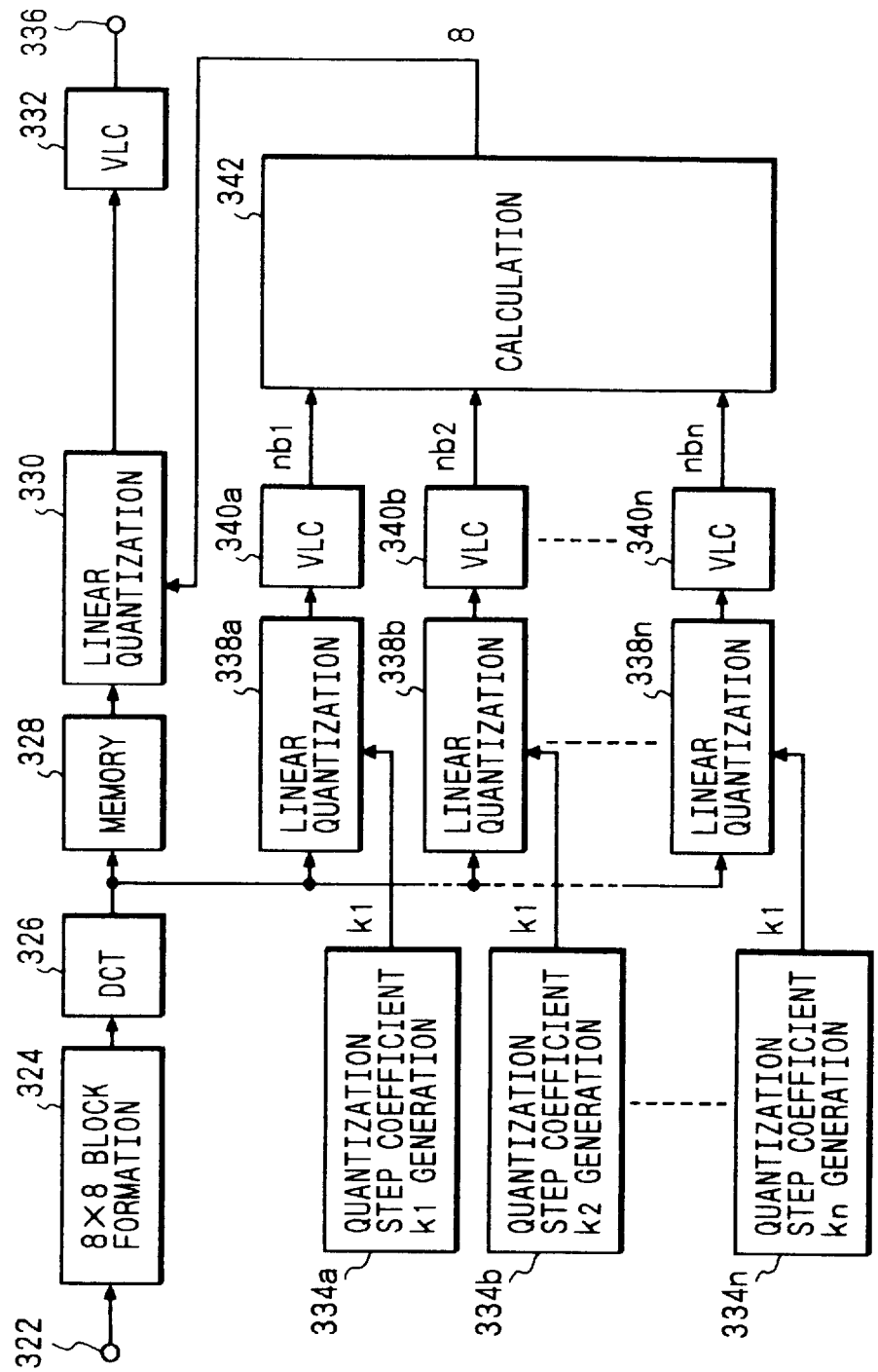
FIG. 16 is a block diagram which illustrates a sixth embodiment of the image encoding apparatus according to the present invention.
Figure 17:
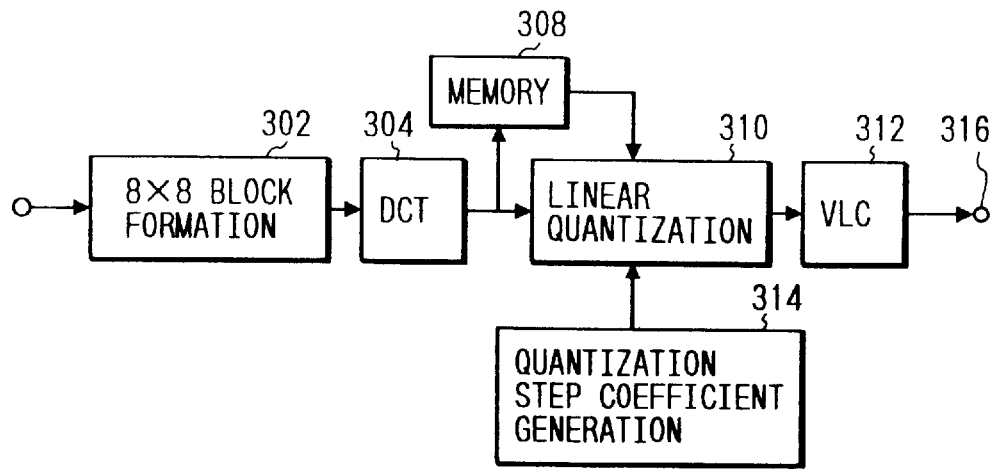
FIG. 17 is a block diagram which illustrates the schematic structure of a conventional encoding system which employs a DCT conversion.

FIG. 16 is a block diagram which illustrates a sixth embodiment of an encoding apparatus according to the present invention and structure in such a manner that the present invention is applied to a transmission apparatus for transmitting an image signal.

Referring to FIG. 16, reference numeral 322 represents an input terminal for receiving a digital image signal. The image signal supplied for each line is, in a block forming circuit 324, divided into blocks each of which is composed of, for example, 8 longitudinal pixels and 8 horizontal pixels.

Figure 22:
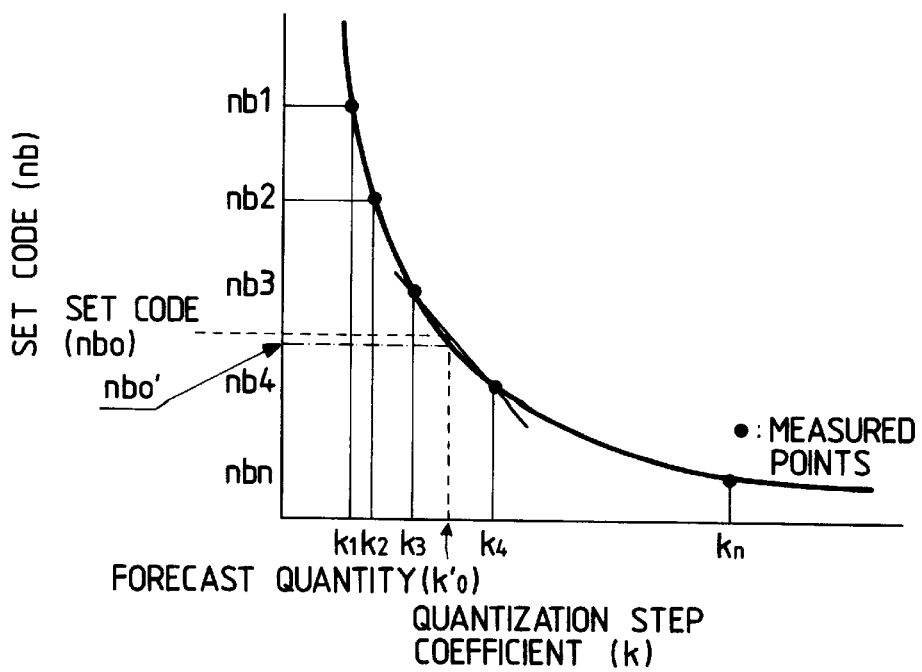
FIG. 22 illustrates the embodiment shown in FIG. 16.
Figure 7:
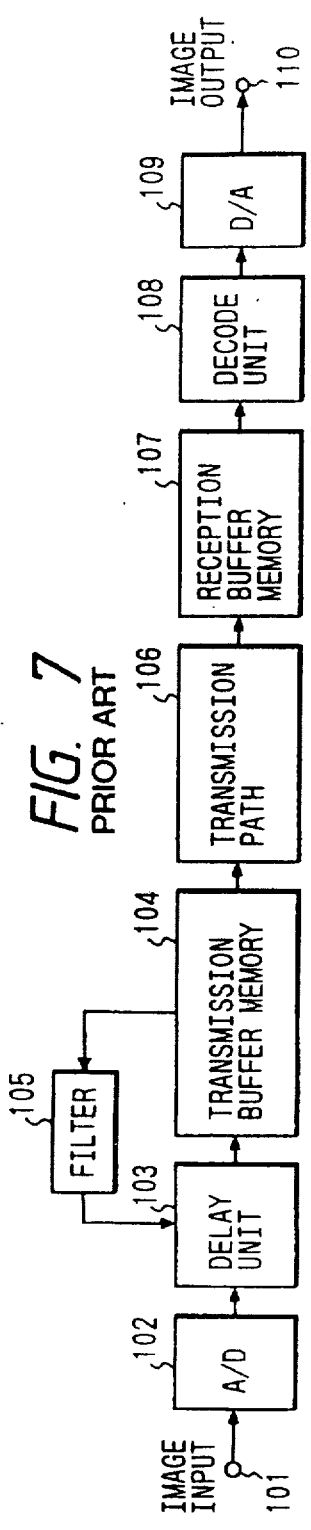
Figure 8:
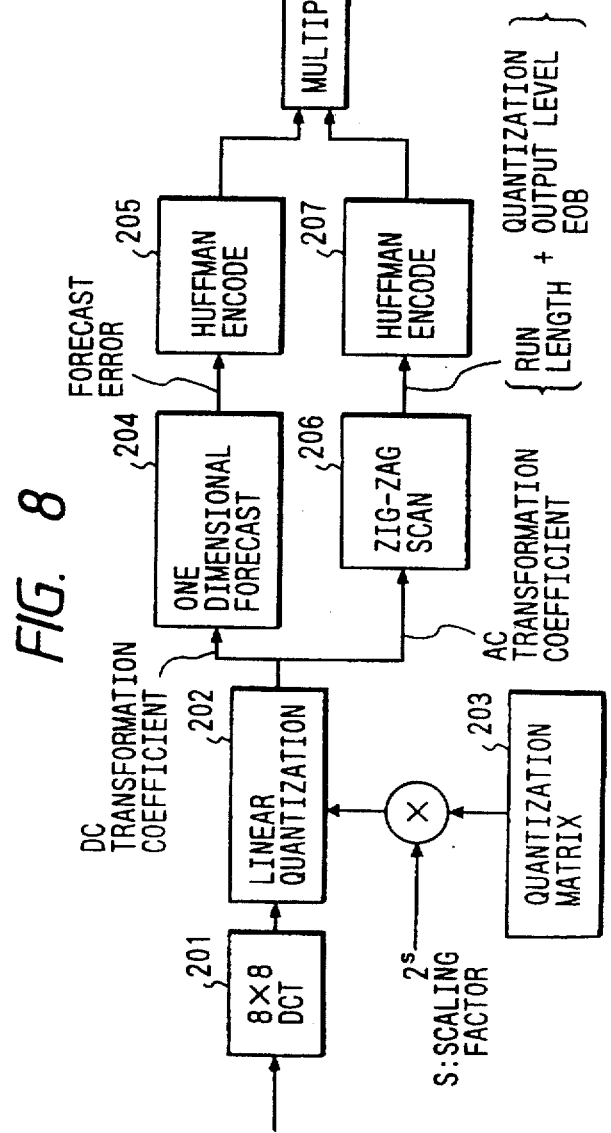

Pixel data in each block is converted into data about the frequency region in a DCT conversion circuit 326. The above-described conversion data is temporarily stored in a memory 328 and as well as the same is linearly quantized in quantizing circuits 338a to 338n with different quantization step coefficients $k_1$ to $k_n$ received from generating circuits 334a to 334n for generating the predetermined quantization step coefficients $k_1$ to $k_n$. According to this embodiment, quantization step coefficients $k_1$ to $k_n$ generated in the generating circuits 334a to 334n are not made in such a manner that the step interval is equalized as shown in FIG. 19 but the same is widened in inverse proportion to the quantity of the quantized code as shown in FIG. 22.

Data quantized by the quantizing circuits 338a to 338n is variable-length encoded by VLCs 340a to 340n so that code quantities $nb_1$ to $nb_n$ for each data are obtained. However, the actual encoded data is not transmitted here but only the quantity of the code is measured before it is transmitted to a calculating circuit 342.

In the calculating circuit 342, code quantities $nb_1$ to $nb_n$ at each measuring point and set code quantities $nb_0$ determined from the transmission rate are subjected to a comparison so as to approximate a measuring point which is larger than $nb_0$ and nearest $nb_0$ and a measuring point which is smaller than $nb_0$ and nearest $nb_0$ are approximated by a straight line. As a result, quantization step coefficient $k_0$ with respect to set code quantity $nb_0$ is estimated before it is transmitted to the quantizing circuit 330. The quantizing circuit 330 receives conversion encoding data transmitted after it has been delayed by a predetermined period by the memory 328 so as to perform the linear quantization with estimated quantizing step coefficient $k_0$ before its result is supplied to a VLC 332.

In the VLC 332, the variable-length encoding operation is performed so that its result is transmitted to the transmission path through a terminal 336 while extremely reducing the error with respect to a predetermined transmission rate.

Figure 20:
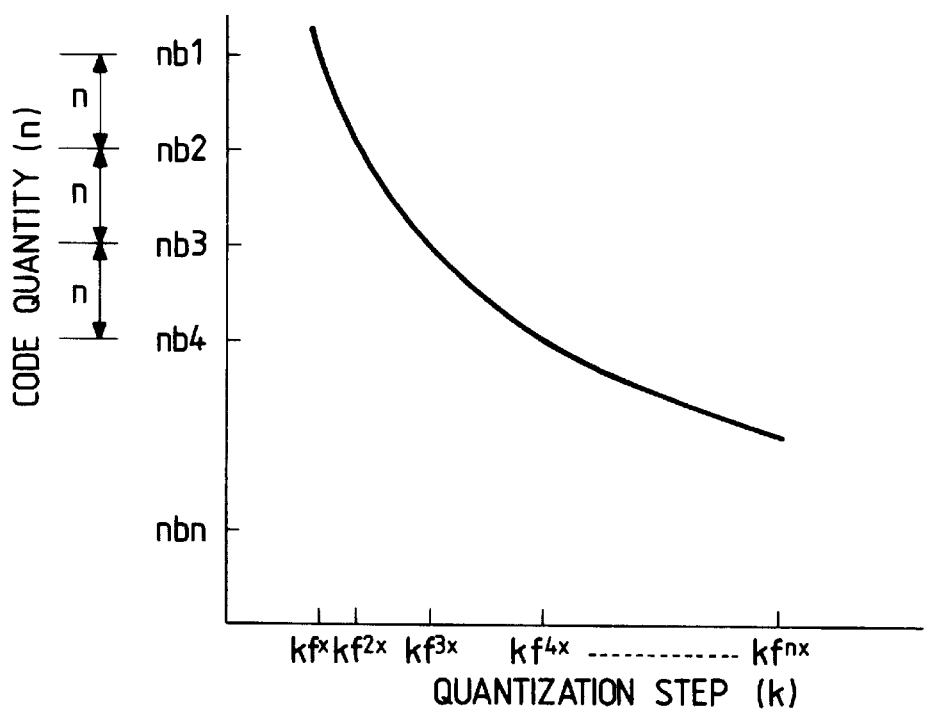
FIG. 20 illustrates a sixth embodiment of the present invention.

According to the above-described structure, the relationship between the total code quantity nb and quantization step coefficient k extremely approximates a log curve. Therefore, the quantization step coefficient is selected in such a manner that the measuring points are set in an expotential function manner as shown in FIG. 20 so that, for example, the interval between the measured results of the code quantities is made to be equalized and the quantization error is made to be constant.

Figure 21:
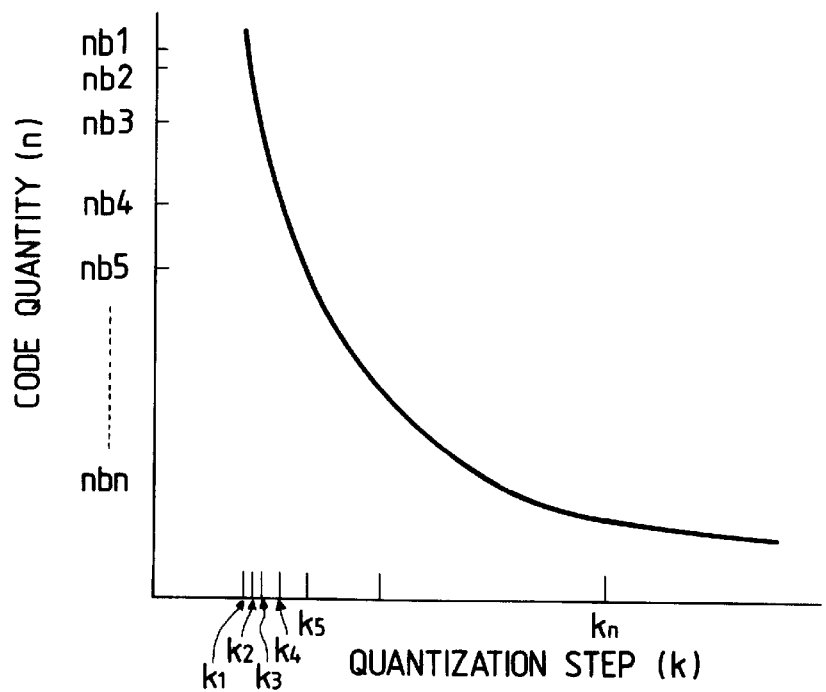
FIG. 21 illustrates the sixth embodiment of the present invention.

Furthermore, an image of a type which encounters a quantization error because of its large code quantity can be processed to improve it in such a manner that the measuring points are, as shown in FIG. 21, set adjacent to the points as each of which the quantization step coefficient is small.

Then, this embodiment will now be described in detail with reference to FIGS. 16 and 22.

First, two quantization step coefficients $k_3$ and $k_4$ are selected, $k_3$ and $k_4$ being arranged to hold the following relationships with optimum quantization step coefficient $k_0$:

$$k_3 < k_4, \quad k_0 < k_4$$

Referring to FIG. 16, the liner quantization and the VLC are performed with the quantization step coefficients $k_3$ and $k_4$ so that compressed code quantities $nb_3$ and $nb_4$ are obtained. Referring to FIG. 22, point $(k_3, nb_3)$ and point $(k_4, nb_4)$ are connected to each other by a straight line so that estimated value $k_0'$ of the quantization step coefficient is obtained from code quantity $nb_0$ set for each predetermined period.

Actually, since optimum quantization step coefficient $k_0$ with respect to $nb_0$ is on a curve shown in FIG. 22, compressed code quantity $nb_0'$ with respect to $k_0'$ and $nb_0$ always hold the following relationship:

$$nb_0' < nb_0$$

As a result, the desired code quantity cannot be exceeded in any case so that it can be quantized.

As a result of the above-described structure, in a case where the code quantity is small and thereby the estimated error of the quantization step coefficient becomes small, the measuring points is decreased. In a case where the code quantity is large and thereby the error becomes large, the measuring points are increased. Therefore, the estimation accuracy of the quantization step coefficient can be improved.

Although the above-described embodiments are arranged in such a manner that the size of the formed block is made to be 8×8, the size may be varied.

Furthermore, an orthogonal conversion (frequency conversion) except for the DCT may be employed.

As described above, according to the image processing apparatus according to the present invention, the data quantity for a predetermined region can be set to a desired data quantity while reducing the quantity of hardware and exhibiting satisfactory high accuracy.

The above-described embodiments are not limited to a moving image but the same can be applied to a still image.

Furthermore, the portion to which the image, which has been A/D converted is supplied is not limited to the monitor. It may be a printer such as laser beam printer or an ink jet printer.

In addition, a plurality of the encoding unit may be arranged to act in parallel. As an alternative to this, it may be arranged to act sequentially in a case where software of a computer is used.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An image processing apparatus comprising:

input means for inputting image data;

first counting means for counting a first encoded data amount corresponding to first encoded image data encoded by using a first control coefficient which determines the first encoded data amount;

second counting means for counting a second encoded data amount corresponding to second encoded image data encoded by using a second control coefficient which determines the second encoded data amount; and generating means for generating encoded image data corresponding to the image data input by said input means in accordance with both the first and second encoded data amounts, wherein said first and second counting means perform counting operations of the first and second encoded data amounts on the same image data in parallel.

2. An image processing apparatus according to claim 1, further comprising determining means for calculating a third control coefficient by using the first encoded data amount and the second encoded data amount.

3. An image processing apparatus according to claim 1, further comprising first and second encoding means each of which includes quantizing means and said control coefficient is a quantizing step.

4. An image processing apparatus according to claim 3, wherein said first and second encoding means perform encoding in parallel.

5. An image processing apparatus according to claim 1, wherein the value of the second control coefficient is larger than that of the first control coefficient and the first amount of encoded image data is larger than the second amount of encoded image data.

6. An image processing method comprising:

an input step of inputting image data;

a first counting step of counting a first encoded data amount corresponding to first encoded image data encoded by using a first control coefficient which determines the first encoded data amount;

a second counting step of counting a second encoded data amount corresponding to second encoded image data encoded by using a second control coefficient which determines the second encoded data amount; and a generating step of generating encoded image data corresponding to the image data input in said input step in accordance with both the first and second encoded data amounts, wherein said first and second counting steps are performed for generating the first and second encoded data amounts on the same image data in parallel.

7. An image processing apparatus comprising:

input means for inputting image data;

first encoding means for encoding the image data with a first control coefficient which determines a first encoded data amount;

second encoding means for encoding the image data with a second control coefficient which determines a second encoded data amount;

first counting means for counting the first encoded data amount of image data encoded by said first encoding means;

second counting means for counting the second encoded data amount of image data encoded by said second encoding means; and generating means for generating encoded image data corresponding to the image data input by said input means, wherein said generating means has a first mode in which the encoded image data is generated in accordance with both the first and second encoded data amounts and a second mode in which the encoded image data is generated by using a predetermined fixed control coefficient which determines a third encoded data amount.

8. An image processing apparatus according to claim 7, wherein said first and second encoding means perform encoding by employing orthogonal transformation.

9. An image processing apparatus according to claim 7, wherein said first and second encoding means perform encoding in parallel.

10. An image processing apparatus according to claim 7, wherein said input means sequentially inputs a plurality of pictures.

11. An image processing apparatus according to claim 7, further comprising memory means for storing said predetermined fixed parameter.

12. An image processing method comprising:

an input step of inputting image data;

a first encoding step of encoding the image data with a first control coefficient which determines a first encoded data amount;

a second encoding step of encoding the image data with a second control coefficient which determines a second encoded data amount;

a first counting step of counting the first encoded data amount of image data encoded in the first encoding step;

a second counting step of counting the second encoded data amount of image data encoded in the second encoding step; and a generating step of generating encoded image data corresponding to the image data input by said input step, wherein said generating step has a first mode in which the encoded image data is generated in accordance with both the first and second encoded data amounts and a second mode in which the encoded image data is generated by using a predetermined fixed control coefficient which determines a third encoded data amount.

13. An image processing apparatus comprising:

input means for inputting image data;

first quantizing means for quantizing the image data with a first quantizing step;

second quantizing means for quantizing the image data with a second quantizing step; and third quantizing means for quantizing the image data with a third quantizing step, wherein a difference between said second quantizing step and said third quantizing step is larger than a difference between said first quantizing step and said second quantizing step when the first quantizing step, the second quantizing step and the third quantizing step increase in sequential order.

14. An image processing apparatus according to claim 13 further comprising counting means for counting the amount of image data quantized by said first, second and third quantizing means.

15. An image processing apparatus according to claim 14 further comprising processing means for processing the input data input by said input means in accordance with the amount counted by said counting means.

16. An image processing apparatus according to claim 15, wherein said processing means performs variable-length coding.

17. An image processing method comprising:

an input step of inputting image data;

a first quantizing step of quantizing the image data with a first quantizing coefficient which determines a first quantizing amount;

a second quantizing step of quantizing the image data with a second quantizing coefficient which determines a second quantizing amount; and a third quantizing step of quantizing the image data with a third quantizing coefficient which determines a third quantizing amount, wherein a difference between said second quantizing coefficient and said third quantizing coefficient is larger than a difference between said first quantizing coefficient and said second quantizing coefficient on the condition that the first quantizing coefficient, the second quantizing coefficient and the third quantizing coefficient increase in sequential order.

18. An image processing apparatus comprising:

input means for inputting image data;

first counting means for counting a first encoded data amount corresponding to first encoded image data encoded by using a first control coefficient which determines the first encoded data amount;

second counting means for counting a second encoded data amount corresponding to second encoded image data encoded by using a second control coefficient which determines the second encoded data amount; and determining means for determining a third control coefficient which determines a third encoded data amount, with which the image data is encoded to a predetermined amount of data, by a primary approximation by using the first and second encoded data amounts.

19. An image processing apparatus according to claim 18, further comprising first and second encoding means, each of which includes quantizing means and said control coefficient is a quantizing step.

20. An image processing apparatus according to claim 18, wherein said first and second encoding means perform encoding in parallel.

21. An image processing apparatus according to claim 18, wherein the value of said second control coefficient is larger than that of said first control coefficient and said first amount of encoded image data is larger than said second amount of encoded image data.

22. An image processing method comprising:

an input step of inputting image data;

a first counting step of counting a first encoded data amount corresponding to first encoded image data encoded by using a first control coefficient which determines the first encoded data amount;

a second counting step of counting a second encoded data amount corresponding to second encoded image data encoded by using a second control coefficient which determines the second encoded data amount;

a determining step of determining a third control coefficient which determines a third encoded data amount, with which the image data is encoded to a predetermined amount of data, by a primary approximation by using the first and the second encoded data amounts.

23. An image processing apparatus comprising:

input means for inputting image data;

first counting means for counting a first encoded data amount corresponding to first encoded image data encoded by using a first encoding control coefficient which determines the first encoded data amount;

second counting means for counting a second encoded data amount corresponding to second encoded image data encoded by using a second encoding control coefficient which determines the second encoded data amount; and generating means for generating encoded image data corresponding to the image data input by said input means, wherein said generating means has a first mode in which the encoded image data is generated in accordance with both the first and second encoded data amounts and a second mode in which the encoded image data is generated by using a predetermined fixed control coefficient which determines a third encoded data amount.

24. An image processing apparatus according to claim 23, wherein said generating means performs the encoding by employing an orthogonal transformation.

25. An image processing apparatus according to claim 23, wherein said first and second counting means perform the counting in parallel.

26. An image processing apparatus according to claim 23, wherein said input means sequentially inputs a plurality of pictures.

27. An image processing apparatus according to claim 23, further comprising memory means for storing the predetermined fixed control coefficient.

28. An image processing method comprising:

an input step of inputting image data;

a first counting step of counting a first encoded data amount corresponding to first encoded image data encoded by using a first encoding control coefficient which determines the first encoded data amount;

a second counting step of counting a second encoded data amount corresponding to second encoded image data encoded by using a second encoding control coefficient which determines the second encoded data amount; and a generating step of generating encoded image data corresponding to the image data input by said input step, wherein said generating step has a first mode in which the encoded image data is generated in accordance with both the first and second encoded data amounts and a second mode in which the encoded image data is generated by using a predetermined fixed control coefficient which determines a third encoded data amount.

* * * * *

UNITED STATES PATENT AND TRADEMARK OFFICE
CERTIFICATE OF CORRECTION

PATENT NO. : 5,838,826

DATED : November 17, 1998

INVENTOR(S) : MASAHIKO ENARI ET AL.

It is certified that error appears in the above-identified patent and that said Letters Patent is hereby corrected as shown below:

ON TITLE PAGE

[56] References Cited  Foreign Patent Documents

```
"02174482" should read --02-174482--;
"02248180" should read --02-248180--.
```

Figure 7:
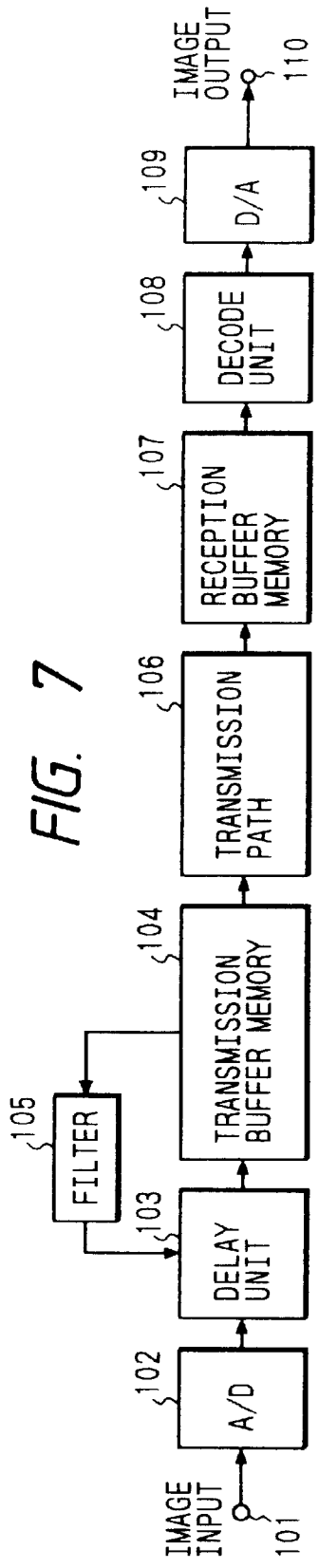
FIG. 7 is a structural block diagram according to a conventional example.

IN THE DRAWINGS:

Sheet 6   In Fig. 7 add the legend --PRIOR ART--.

COLUMN 3

```
line 47,  "a" should be deleted; and
line 48,  "calculating" should read --calculating a--.
```

COLUMN 4

```
line 2,   "increases" should read --increase--.
```

COLUMN 5

```
line 5,   "perfomred" should read --performed--;
```

UNITED STATES PATENT AND TRADEMARK OFFICE
CERTIFICATE OF CORRECTION

PATENT NO.   : 5,838,826
DATED        : November 17, 1998
INVENTOR(S)  : MASAHIKO ENARI ET AL.

It is certified that error appears in the above-identified patent and that said Letters Patent is hereby corrected as shown below:

COLUMN 5 line 15,   "ruptured by" should read --exceeded by--; and
   line 16,   "can easily be designed." should be deleted.

COLUMN 6 line 14,   "a" should be deleted; and
   line 63,   "exceeds" should read --exceed--.

COLUMN 7 line 1,   "similarly" should read --similar--; and
   line 66,   "B" should read --$B_o$--.

COLUMN 8 line 9,   "$B_o > B$" should read --$B_o > B_o'$--.

COLUMN 9 line 28,   "exceeds" should read --exceed--;

UNITED STATES PATENT AND TRADEMARK OFFICE
CERTIFICATE OF CORRECTION

PATENT NO. : 5,838,826

DATED : November 17, 1998

INVENTOR(S) : MASAHIKO ENARI ET AL.

It is certified that error appears in the above-identified patent and that said Letters Patent is hereby corrected as shown below:

COLUMN 9 line 29, "or" should read --of--;
line 31, "si" should read --is--; and
line 32, "similarly" should read --, which is similar--.

COLUMN 10 line 18, "$B_o > B_o$" should read --$B_o > B_o'$--;
line 36, "resulting" should read --resulting in--; and
line 49, after "numbers" insert --is unnecessary,--.

COLUMN 11 line 19, "similarly" should read --similar--.

COLUMN 13 line 51, "processes" should read --derived--.

UNITED STATES PATENT AND TRADEMARK OFFICE
CERTIFICATE OF CORRECTION

PATENT NO. : 5,838,826
DATED : November 17, 1998
INVENTOR(S) : MASAHIKO ENARI ET AL.

It is certified that error appears in the above-identified patent and that said Letters Patent is hereby corrected as shown below:

<u>COLUMN 15</u>

```
line 21,   "expotential" should read --exponential--;
line 39,   "liner" should read --linear--; and
line 60,   "is" should read --are--.
```

Signed and Sealed this

Twentieth Day of July, 1999

Attest:

Q. TODD DICKINSON

*Attesting Officer*   *Acting Commissioner of Patents and Trademarks*